(12) United States Patent
MacCormack et al.

(10) Patent No.: US 10,751,939 B2
(45) Date of Patent: Aug. 25, 2020

(54) DESKTOP PRINTING APPARATUS FOR 3D PRINTING AN OBJECT AND DUPLEX PRINTING MODULE

(71) Applicant: MCOR Technologies Limited, Ardee (IE)

(72) Inventors: Conor MacCormack, Ardee (IE); James Travers, Rush (IE); Fintan MacCormack, Ardee (IE)

(73) Assignee: MCOR TECHNOLOGIES LIMITED, Ardee (IE)

( * ) Notice: Subject to any disclaimer, the term of this patent is extended or adjusted under 35 U.S.C. 154(b) by 327 days.

(21) Appl. No.: 15/524,575

(22) PCT Filed: Nov. 4, 2015

(86) PCT No.: PCT/EP2015/075755
§ 371 (c)(1),
(2) Date: May 4, 2017

(87) PCT Pub. No.: WO2016/071420
PCT Pub. Date: May 12, 2016

(65) Prior Publication Data
US 2018/0272603 A1    Sep. 27, 2018

(30) Foreign Application Priority Data

Nov. 4, 2014 (GB) .................................. 1419670.3

(51) Int. Cl.
*B29C 64/20* (2017.01)
*B29C 64/141* (2017.01)
(Continued)

(52) U.S. Cl.
CPC ............ *B29C 64/20* (2017.08); *B29C 64/141* (2017.08); *B41J 2/01* (2013.01); *B41J 11/008* (2013.01); *B41J 15/04* (2013.01); *B41J 15/16* (2013.01)

(58) Field of Classification Search
CPC .................................................. B29C 64/147
(Continued)

(56) References Cited

U.S. PATENT DOCUMENTS 4,769,652 A * 9/1988 Cleary ..................... B41J 15/06
242/535
5,015,312 A * 5/1991 Kinzie ..................... B26D 7/18
156/252

(Continued)

FOREIGN PATENT DOCUMENTS

EP    2 141 003 A2    1/2010
EP       2141003 A2 *  1/2010 ........... B29C 64/141
(Continued)

*Primary Examiner* — Matthew J Daniels
*Assistant Examiner* — Hana C Page
(74) *Attorney, Agent, or Firm* — Schwabe Williamson & Wyatt, PC

(57) ABSTRACT

A desktop printing apparatus (100) for 3-D printing an object comprising: a print module (200) and a build module (300) provided in-line in a unitary housing. The print module comprising one or more print heads (230, 230') for printing a portion of a medium (500) to define a media layer (701) of the object. The build module a build plate (310), and cutting means (321), bonding means and adhesive dispensing means (320) for building the 3D object from a plurality of media layers. The apparatus further comprising a medium transport passage defined in the housing between a medium input and medium output, and a transport means (160) to continuously transport the medium from the medium input along the medium transport passage through
(Continued)

the print module for printing and subsequently to the build module for profiling and bonding to define a media layer of the object.

23 Claims, 17 Drawing Sheets

(51) Int. Cl.
*B29C 64/147* (2017.01)
*B29C 64/393* (2017.01)
*B41J 2/01* (2006.01)
*B41J 11/00* (2006.01)
*B41J 15/04* (2006.01)
*B41J 15/16* (2006.01)

(58) Field of Classification Search
USPC .......................................................... 156/242
See application file for complete search history.

(56) References Cited

U.S. PATENT DOCUMENTS

| | | |
|---|---|---|
| 6,506,477 B1 | 1/2003 | Ueda |
| 2015/0078627 A1* | 3/2015 | Fukase .................... G06T 7/001 |
| | | 382/112 |

FOREIGN PATENT DOCUMENTS

| | | | | |
|---|---|---|---|---|
| WO | 2014/015994 A1 | 1/2014 | | |
| WO | WO-2014015994 A1 * | 1/2014 | ........... | B29C 64/141 |
| WO | 2014/131848 A2 | 9/2014 | | |

* cited by examiner

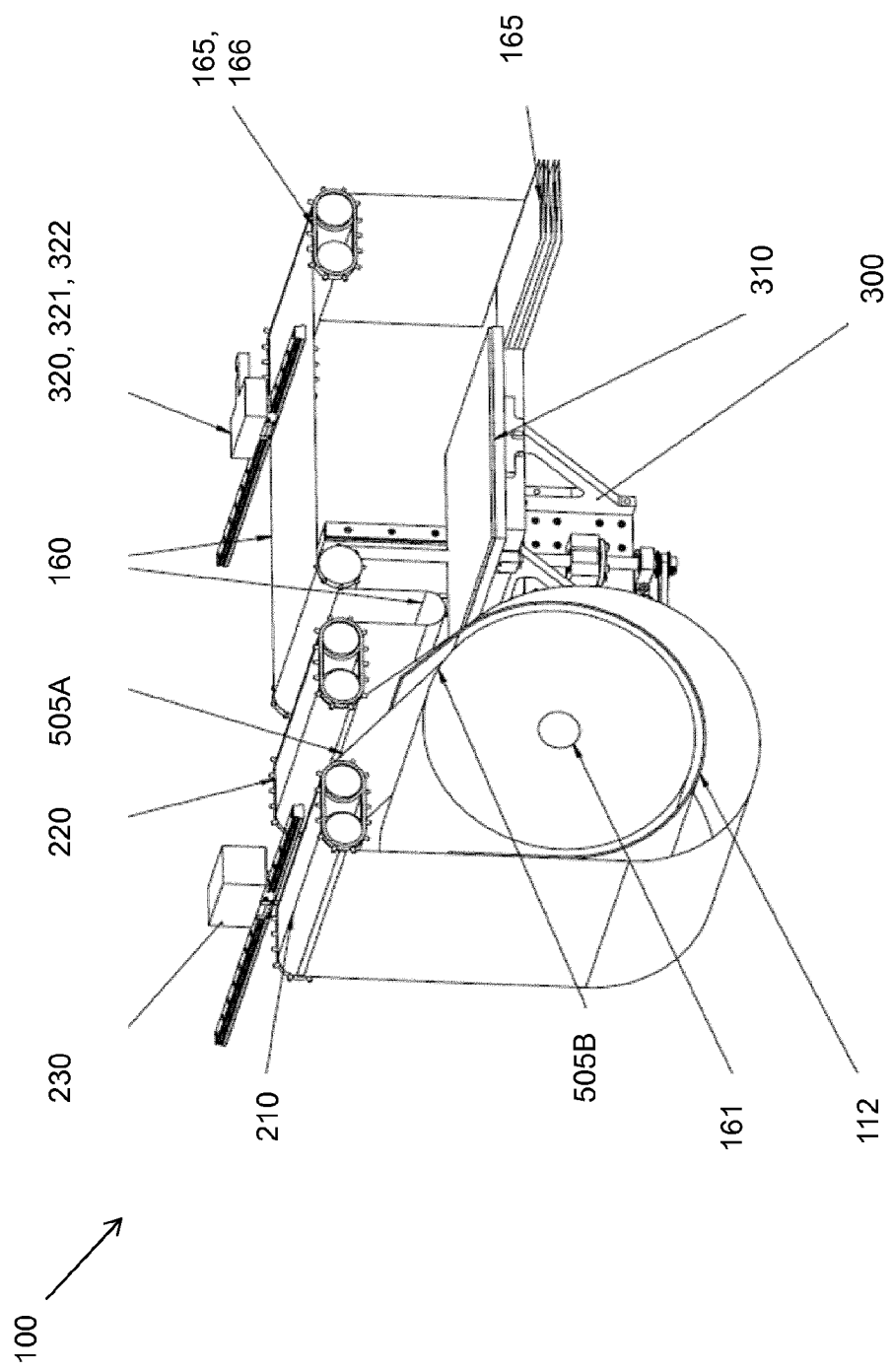

DESKTOP PRINTING APPARATUS FOR 3D PRINTING AN OBJECT AND DUPLEX PRINTING MODULE

FIELD

The present application relates to Layered Object Manufacture (LOM) systems for rapid prototyping (RP), and in particular to a desktop apparatus that integrates conventional 2-D and 3D printing to form a 3D object in a LOM system.

BACKGROUND OF THE INVENTION

Rapid prototyping is defined as computer-controlled additive fabrication, in that an object can be fabricated by the addition of material rather than conventional machining methods that rely on removal or the subtraction of material. The term "rapid" is, it will be appreciated, a relative term but one that has specific meaning within the art, in that construction of a finished three dimensional article can take from several hours to several days, depending on the method used and the size and complexity of the model. There are many known methodologies that are employed within the general field of rapid prototyping Layered Object Manufacture (LOM) is one form of Rapid prototyping (RP) which relates to the successive layering of adhesive-coated paper, plastic, or metal laminates which are then successively glued together and cut to shape with a knife or laser cutter.

LOM, similarly to other rapid prototyping techniques, conventionally involves the use of a three dimensional (3D) computer aided design (CAD) of an object/part to be made, from which a stereolithography (STL) or other suitable format file is generated within a CAD package. The STL file is processed and in effect virtually sliced in the Z-axis at a thickness matching the thickness of the substrate material used. This creates a series of cross sections of the part and at any particular height each one has a simple two dimensional (2D) profile. A profiling, or cutting, apparatus may be used to trace the 2D profiles and thus cut the shapes onto thin sheets of raw material. In LOM, each individual thin sheet may be stacked and bonded one on top of another to produce a finished 3D object. After a plurality of media object layers are formed, a profiling and layer bonding process is performed. The plurality of layers are bonded together, and then a profiling or weeding process is performed which comprises removing unwanted support material from the printed media stack to reveal the 3D printed object. The order of the profiling, stacking and bonding processes may be interchanged. The individual layers may also be printed using conventional 2D printing processes. The layers may be singly or duplex printed, and printed either in a single colour such as with black ink, or colour printed with a plurality of colours. In addition multi-coloured paper may be used.

In LOM manufacturing, typically a finished 3D object is formed from a stack of individual media layers which are assembled and profiled to form the desired final geometrical shape. The individual media layers may be printed or otherwise treated prior to the assembly arrangement. Accordingly, a plurality of 3D object media layers may be printed in preparation for forming the finished 3D printed article. The entire layer stack for the 3D printed article may be pre-printed off-line in the printing module, after which the printed stack may be loaded into the profiling and layer bonding module where each printed layer may be profiled and bonded to complete the fabrication of the 3D printed article.

Problems may arise in terms of alignment of the images printed on the opposite sides of the printed media layers in preparation for the collation and assembly into the final 3D object. Problems may also arise if the printed sheets provided as input to a 3-D printer are not in the correct order.

Some printers can be used to manufacture parts in colour. In one approach, for example, coloured sheets may be used. In another approach, for example, a coloured ink may be printed onto each sheet of paper or an image may be printed onto each sheet and the printed sheets may then be loaded into the section of the printer where the cutting and gluing occurs.

It will be appreciated that use of coloured sheets and/or inks and printing of images may add further complexity to the 3D printer machine and/or processes.

Considerations in choosing a 3D printing machine include speed, cost of the 3D printer, cost of the printed prototype, and cost and choice of materials and colour capabilities. Often the cost of 3D printing is too high to be practical for most consumer applications. Furthermore, often currently available 3D printers are too large for consumer application.

The use of paper in SDL has brought down the cost of raw materials, but the size and complexity of printers remains and there is a need to develop more compact and less complex printers, which can be produced more cheaply and fit on a consumer's home desktop.

There are therefore a number of issues with 3D printing processes and systems for rapid prototyping that need to be addressed. The present application is aimed at providing an improved method of manufacturing coloured objects. The present specification is aimed also at providing and improved 3D printing system.

SUMMARY

According to the present specification there is provided a desktop printing apparatus for 3-D printing an object comprising:
  a build module for building a 3D object from a plurality of media layers, the apparatus further comprising
  a print module for printing a medium, the printed medium defining a media layer of the object;
  transport means configured to continuously transport the medium from an input to the print module for printing the media layer and to transport the printed media layer to the build module.

In one arrangement, the build module comprising adhesive dispensing means, cutting means, and bonding means for building the 3D object.

In one arrangement, the build module configured to manufacture the 3D object by selective deposition lamination (SDL).

In one arrangement, the print module and build module are arranged in-line in a single integrated apparatus, and the transport means is configured to transport the medium from an input to the print module and to the build module in a continuous in-line transport operation.

In one arrangement, the print module and build module are configured to operate simultaneously, as the transport means transports the medium through the apparatus.

In one arrangement, the print module and build module operate independently, as the transport means transports the medium through the apparatus.

In one arrangement, the print module being configured for single or duplex printing of the medium.

In one arrangement, the print module configured for duplex printing of the medium, wherein a first image of an image pair to be printed on a media layer is printed on a first side of the medium and a second image of the image pair is printed on the second side of the medium back to back to the first image to define a printed media layer of the object.

In one arrangement, the print module further configured to print a fiducial mark on a first side of a medium, wherein the fiducial mark comprises a mark configured to provide information about the image printed on the first side of the medium, for example, a locator mark, or an image identifier to identify the image from the sequence of images for printing.

In one arrangement, the apparatus further comprising
sensing means for sensing an image, or a portion of the image, or fiducial mark printed on a first side of the medium; and
the sensing means providing output to a controller for controlling the location of the medium for controlling the printing of a second image on the second side of the medium back to back to the first image.

In one arrangement, the controller is configured to control the apparatus to correct or any detected skew or location error.

In one arrangement, the transport means comprises a feed roller and/or drive or pinch rollers or nip rollers and/or guide means.

In one arrangement, the transport means further comprising a take-up roller to maintain the tension of the medium as it is transported through the apparatus and through the print and build modules.

In one arrangement, the apparatus comprising first and second print stations, wherein the printhead is configured to print an image on a first side of the medium at the first print station and to print an image on the second side of the medium at the second print station.

In one arrangement, the transport means defines a medium transport path, wherein the medium is transported from the input through the printing module and to the build module.

In one arrangement, the first and second print stations are located spaced apart along the transport path.

In one arrangement, the printhead is movable between the first print station and the second print station for printing first and second sides of the medium.

In one arrangement, the transport means is configured to invert the medium as the medium is transported from the first print station to the second print station.

In one arrangement, the apparatus comprising a single print head.

In one arrangement, the first print station configured for printing the medium in a first orientation, the second print station configured for printing the medium is a second orientation.

In one arrangement, the transport means comprising a receptacle for receiving the medium in continuous roll form.

In one arrangement, the apparatus comprising first and second print head for printing simultaneously on first and second surface of the medium at first and second print stations.

In one arrangement, the specification provides a desktop 3D printing apparatus as per above wherein the duplex printing module and the build module are provided in a single integrated apparatus and the transport means is configured to transport the medium from an input through the printing module to the build module for assembly to form a 3D object in a continuous in-line process.

In another arrangement there is provided a duplex printing module for a 3D printing apparatus comprising: printing means and transport means, the transport means configured to:
transport a medium from an input to the printing means for effecting a printing of the medium on a first side and on a second side, and to
wherein a first image of an image pair to be printed on the medium is printed on a first side of the medium and a second image of the image pair is printed on the second side of the medium back to back to the first image.

In one arrangement, the printed image pair defines a printed media layer of a 3D object.

In one arrangement, the print head is configured to move in X and Y directions relative to the plane of the media layer.

In one arrangement, the module comprising:
a print head configured to print an image on a first side of the medium and to print a machine readable position locator on the first side of the medium,
an optical reader configured to read the machine readable position locator and effect a change in position of the medium or print head relative to a second side of the medium to ensure correct alignment an image to be provided on the second side relative to the printed image provided on the first side.

According to an aspect of the specification there is provided a desktop printing apparatus for 3-D printing an object comprising:
a print module and a build module arranged in-line in a unitary housing;
the print module comprising one or more print heads for printing a portion of a medium to define a printed media layer of the object;
the build module comprising a build plate, cutting means, bonding means and adhesive dispensing means and operable to build the 3D object from a plurality of individual media layers;
the apparatus further comprising
a medium transport passage defined in the housing between a medium input and medium output; and
a transport means to continuously transport the medium from the input along the medium transport passage to the print module and subsequently to the build module.

In one arrangement, the build module configured to manufacture the 3D object by selective deposition lamination (SDL).

In one arrangement, the print module and build module are arranged in-line in a single integrated apparatus, and the transport means is configured to transport the medium from an input to the print module and to the build module in a continuous in-line transport operation.

In one arrangement, the print module and build module are configured to operate simultaneously, as the transport means transports the medium through the apparatus.

In one arrangement, the print module and build module are configured to operate simultaneously on different portions of the medium, which define different media layers of the object, as the transport means continuously transports the medium through the apparatus.

In one arrangement, the print module and build module operate independently, as the transport means transports the medium continuously through the apparatus.

In one arrangement, the print module being configured for single-sided or duplex printing of the medium. In one arrangement, the print module configured for duplex printing of the medium, wherein a first image of an image pair to be printed on a media layer is printed on a first side of the medium and a second image of the image pair is printed on the second side of the medium back to back to the first image to define a printed media layer of the object.

In one arrangement, the print module further configured to print a fiducial mark on a first side of a medium, wherein the fiducial mark comprises a mark configured to provide information about the image printed on the first side of the medium, for example, a locator mark, or an image identifier to identify the image from the sequence of images for printing.

In one arrangement, the transport means comprising a feed mechanism and controller, the controller configured to control transport of the medium though the apparatus and the location of different portions of the medium in the apparatus.

In one arrangement, the apparatus further comprising sensing means for sensing location of a portion of the medium and for providing output to the controller for controlling or correcting the location of the medium.

In one arrangement, the apparatus further comprising
  sensing means for sensing an image, or a portion of the image, or fiducial mark printed on a first side of the medium; and
  the sensing means providing output to the controller for controlling the location of the medium for controlling the printing of a second image on the second side of the medium back to back to the first image.

In one arrangement, the controller is configured to control the apparatus to correct or any detected skew or location error. In one arrangement, the transport means includes one or more of a feed roller, drive roller, pinch roller, nip roller, and guide means. In one arrangement, the transport means comprises a feed roller configured to run in the clockwise and opposite anti-clockwise direction to control the location of different portions of the medium within the apparatus. In one arrangement, the transport means further comprising a take-up roller to maintain the tension of the medium as it is transported through the apparatus and through the print and build modules and to provide accurate location of different portions of the medium at the print module and at the build module respectively.

In one arrangement, the apparatus comprising first and second print stations, wherein the print head is configured to print an image on a first side of the medium at the first print station and to print an image on the second side of the medium at the second print station.

In one arrangement, the transport means defines a medium transport path, wherein the medium is transported from the input through the printing module and to the build module. In one arrangement, wherein the medium transport path is provided from a medium input to a waste collection point. In one arrangement, the medium is transported continuously along the medium transport path from the input to the print and build modules wherein the medium is first printed and subsequently profiled to define a media layer of the build object.

In one arrangement, the first and second print stations are located spaced apart along the transport path. In one arrangement, the print head is movable between the first print station and the second print station for printing first and second sides of the medium. In one arrangement, the transport means is configured to invert the medium as the medium is transported from the first print station to the second print station. In one arrangement, the apparatus comprising a single print head. In one arrangement, the first print station configured for printing the medium in a first orientation, the second print station configured for printing the medium is a second orientation. In one arrangement, the transport means comprising a receptacle for receiving the medium in continuous roll form.

In one arrangement, the apparatus first and second print heads for printing simultaneously on first and second surface of the medium at first and second print stations.

In one arrangement, the medium is transported to a location above the build plate for profiling to a cut a portion of the medium from the roll to define a media layer of the object.

An another aspect there is provided a desktop 3D printing apparatus as set out in any the above summary wherein the printing module and the build module are provided in a single integrated apparatus and the transport means is configured to transport the medium from an input through the printing module to the build module where media layers are assembled to form a 3D object in a continuous in-line process.

According to another aspect there is provided a duplex printing module for a 3D printing apparatus comprising:
  printing means and transport means, the transport means configured to:
  transport a medium from an input to the printing means for effecting a printing of the medium on a first side and on a second side, and to
  transport the duplex printed medium from the print module to a build module of the 3D printing apparatus.

In one arrangement, the module is configured for duplex printing of the medium, wherein a first image of an image pair to be printed on the medium is printed on a first side of the medium and a second image of the image pair is printed on the second side of the medium back to back to the first image, to define a printed media layer of a 3D object. In one arrangement, the print head is configured to move in X and Y directions relative to the plane of the media layer.

In one arrangement the module includes a print head configured to print an image on a first side of the medium and to print a machine readable position locator on the first side of the medium, an optical reader configured to read the machine readable position locator and effect a change in position of the medium or print head relative to a second side of the medium to ensure correct alignment of an image to be provided on the second side relative to the printed image provided on the first side.

In one arrangement, the medium is printed in a substantially vertical orientation.

In one arrangement, the medium is printed in a substantially horizontal orientation.

In one arrangement, the module comprises first and second print stations are located spaced apart along the transport path. In one arrangement, the print head is movable between the first print station and the second print station for printing first and second sides of the medium. In one arrangement, the transport means is configured to invert the medium as the medium is transported from the first print station to the second print station.

In one arrangement the module comprising a single print head. In one arrangement the first print station configured for printing the medium in a first orientation, the second print station configured for printing the medium is a second orientation.

In one arrangement, the transport means comprising a receptacle for receiving the medium in continuous roll form.

In one arrangement, the module comprising first and second print heads for printing simultaneously on first and second surface of the medium at first and second print stations. In one arrangement, the medium is transported to pass vertically between two print heads 230 and 230' operating in a horizontal configuration printing in duplex simultaneously.

BRIEF DESCRIPTION OF THE DRAWINGS

The present application will now be described with reference to the accompanying drawings in which:

FIG. 16 is a perspective side view of the alternative printing apparatus according to the present specification of FIG. 15,

DETAILED DESCRIPTION OF THE DRAWINGS

Exemplary arrangements of a desktop printing apparatus that uses Selective Deposition Lamination (SDL) in accordance with the present teaching will be described hereinafter to assist with an understanding of the benefits of the present teaching. Such arrangements will be understood as being exemplary of the type of apparatuses that could be provided and are not intended to limit the present teaching to any one specific arrangement as modifications could be made to that described herein without departing from the scope of the present teaching.

The present specification provides an SDL desktop apparatus that integrates conventional printing and 3D printing. The apparatus is configured to print and assemble a plurality of individual media layers to form a three-dimensional (3D) object. Within the context of the present teaching, the individual media layers may be considered distinct physical elements or entities. Within the context of the present teaching the individual media layers are drawn or obtained from an input comprising a roll of medium. In a preferred arrangement the individual media layers of the 3D object may be derived from a roll input.

Figure 1A:
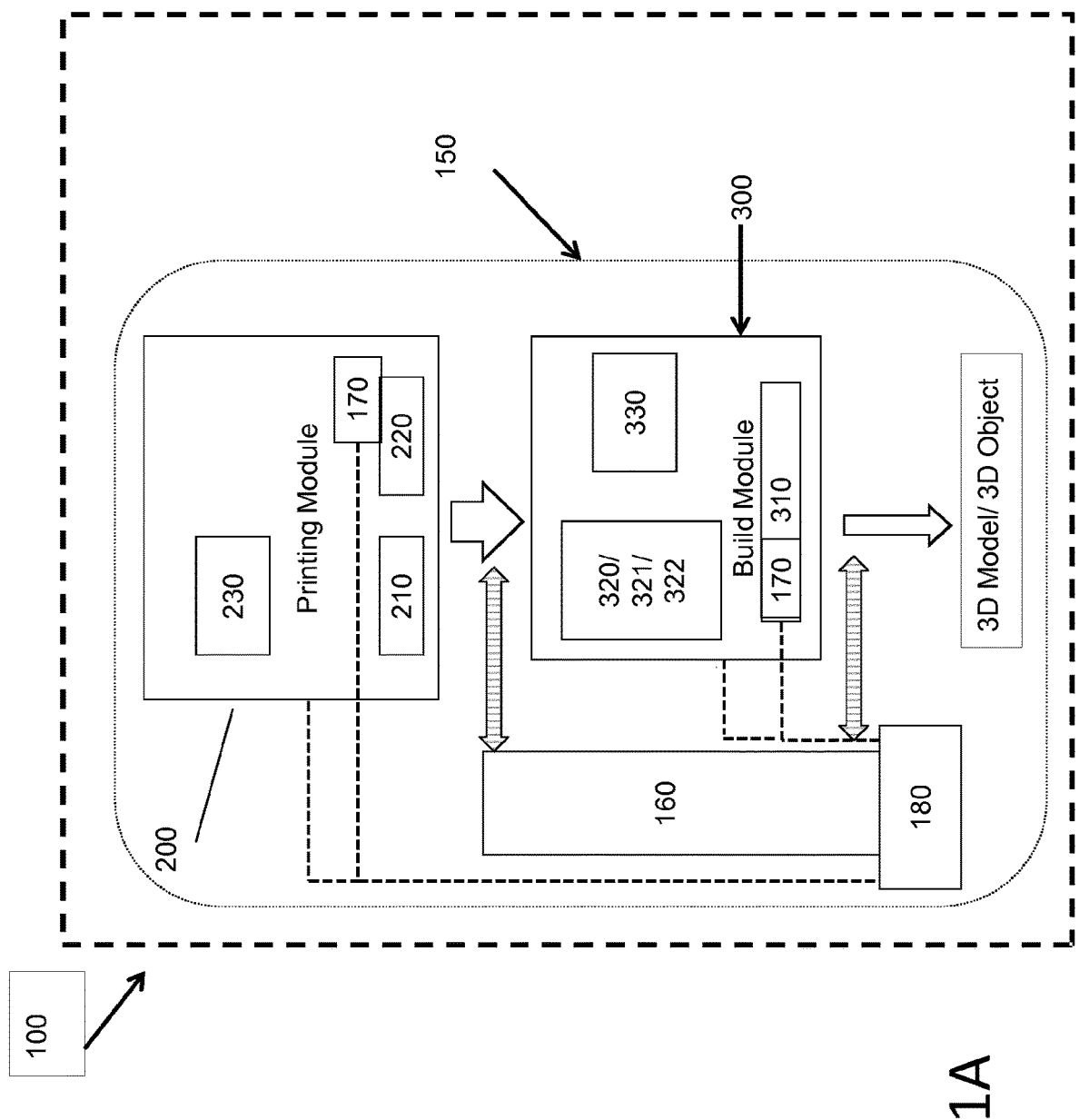
FIG. 1A is a block diagram of a printing apparatus according to an embodiment of the present teaching.

FIG. 1A is a block diagram of a desktop SDL apparatus 100 according to the present specification. The desktop SDL apparatus (3D printing apparatus) 100 comprises a printing module 200, and a SDL build module 300. The printing module may be configured to print a plurality of media layers, and the build module to assemble the plurality of the individual media layers to form the 3D object. The media layers may be printed with a single black ink, or colour printed with a plurality of colours or no colour—i.e. white. The build module may be configured to cut the individual 3D object media layers and bond the individual layers together to form the finished 3D object. The printing module 200 and the build module 300 may be integrally coupled within the apparatus 100 such that media layers may be single-side or duplex printed in the printing module 200 before being transported to the build module 300 to produce the completed 3D object.

In the specification the build module describes the module of the 3D printing which the layered objects are assembled to form the 3D object. The terms build module, collator module, build chamber and build module, SDL build module have variously been used to describe this feature.

Media layers are transported to the printing module 200 for 2D printing. The printed media layers are transported from the printing module to the build chamber for collation and assembly of the final 3D object in an SDL process.

Media layers in the arrangement described are provided in roll form. The media layers are preferably of paper, however, it will be appreciated that any sheet or roll material may be used. The media is provided to the desktop apparatus 100 to be 2D printed, profiled and bonded, thereby producing a completed colour 3D object.

The printing module may comprise a conventional 2D printer configured to apply the ink to the media layers prior to collation. The 2D printer may be a standard inkjet printer. The build module may comprise a bonding module configured to bond individual ones of the plurality of media layers. The printing module may be configured to print on first and second surfaces of the media layers. The printing on first and second surfaces operably reduces image bleed and preserves colour accuracy regardless of angle of the object's surface. The printing module may be configured to apply multiple colours to one or more surfaces of one or more of the plurality of individual media layers. The collator may comprise a profiling module configured to effect a profiling of individual ones of the plurality of media layers to effect a desired 3D shape within the 3D object. The profiling module and the bonding module may be integrated in a single profiling and layer bonding module.

Image 600A printed on a media layer 701 is printed in accordance with a pre-generated digital print file containing image, profile and colour information for the 3D object to be printed.

Steps in an exemplary arrangement of pre-generating a digital print file are briefly explained herein, however, it will be appreciated that alternative methods may be provided. As is known in the art, 3D printing starts with a 3D data file, which is representative of the 3D object to be printed. For example the universal industry standard file format for 3D product designs, STL, as well as OBJ and VRML (for colour 3D printing) can be used with the present teaching, however, it will be appreciated that suitable alternatives may also be used. Colour is then generated and applied to the model represented in the data file. The data in such files is read and the computer model is sliced into printable layers equivalent in thickness to the media layer. Such generation of the data file usually takes place at a PC or computing device connected to the printer 100 however this should not be interpreted as limiting as such processing may also take place in the printing apparatus 100. It will be appreciated that in alternative arrangements the slicing could be performed in the cloud, or on a mobile device, tablet, phone. Furthermore the present teachings are not limited to the above method of file generation and any suitable method of generating 3D print files may be used.

The pre-generated file is provided or otherwise loaded to the printing apparatus 100 prior to beginning the print job and SDL job—although not shown, the printing apparatus 100 includes a processor or controller and as well as memory onto which the print file is loaded.

The digital print file is again referenced or read by the controller/processor. The digital print file may comprise a series of top-side-bottom-side image pairs 600A/600B for each media layer 701. Colour image information for both the first side and the second side for all media layers is also contained in the digital print file.

Figure 1B:
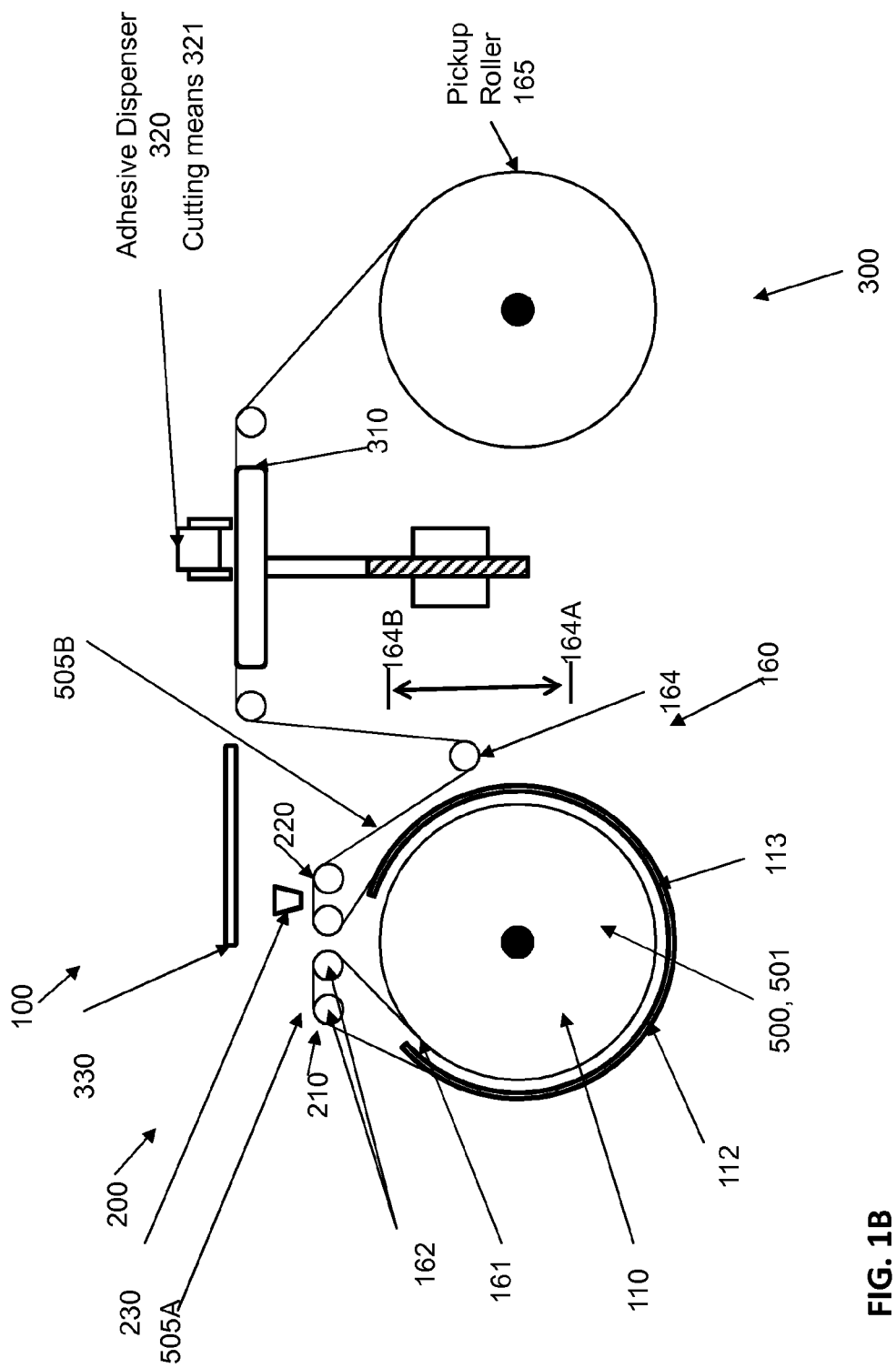
FIG. 1B cross-sectional side view of a 3D desktop printing apparatus according to an embodiment of the present specification.

Referring to FIGS. 1A and 1B an integrated desktop 2-D and 3-D printing apparatus 100 according to an arrangement of the present specification is described.

Desktop printing apparatus 100 comprises a print module 200 and a collating or build module 300. Apparatus 100 provides for manufacture of an object by SDL. In the arrangement shown, the medium is provided in roll form. The medium, in the exemplary arrangement, paper is provided in roll form, and is used to form layers of the build object. The apparatus 100 provides printing of the medium at the print module 200 and transfer of the printed media from the print module to the collating/build module 300 and to the build location.

The apparatus 100 is configured to provide in a continuous in-line process 2-D printing and 3D printing or manufacture of a 3D build object by SDL by collating, bonding and profiling of the printed media layers 701. The 2-D printing may be on or side or on both side of the medium, i.e. simplex or duplex.

Apparatus 100 provides and defines a continuous transport path or passage within the housing for the medium through printing module 200 and collating or SDL module 300. Apparatus 100 further comprises a feed or transport module 150 comprising a feed or transport means 160. The system 100 may further include sensing means 170. Further the system 100 may further include control means 180 for effecting control of the feed or transport mechanism. The transport module includes a feed mechanism including one or more rollers or guides as required. Also provided is a controller to control transport.

The sensing means 170 may comprise one or more sensors, for example optical sensors configured to detect the position of the media, to detect a printed image or portion thereof, or to detect fiduciary marks printed on the media at the same time as the image is printed. The sensing means 170 may be used to detect skew, to detect position and location and to identify the media or the location of a particular printed image within the system. Data detected by the sensor may be provided or outputted to the control means, and processed therein to effect correction of skew or correction of position or for example to identify the image on a first side, and to locate the second side image relative to the first side image.

Apparatus 100 of an exemplary arrangement of the specification is described with reference to FIG. 1. Apparatus 100 comprises a roll support 110 for receiving medium 500 in roll form 501. The support 110 has a housing 112. The housing defines on a first inner side the roll receptacle or support 110 and on a second outer side the housing defines a guide 113 for guiding the medium 500 as it is transported through the apparatus. Apparatus 100 defines a transport path 140 for the medium to pass through the apparatus for 2-D printing and 3-D printing.

The print module 200 comprises a first print station 210 and second print station 220 and a print head 230. In the exemplary arrangement, the print head 230 is arranged to print at both print stations. However, it will be appreciated that an in alternative arrangement two print heads may be provided. The print head 230 may be an inkjet print head. The medium 500 provided in roll form 501 having a first surface 505A and a second surface 505B is drawn from roll 501 and transported to the first print station 210 for printing a first side 505A. The media is then transported to the second print station 220 for printing the second side 505B. In the apparatus 100 of the exemplary arrangement the first side 505A defines the underside of the build object layer and the second side 505B defines the upper side of a build object layer 701.

The transport means 160 of the exemplary arrangement comprises feed roller 161-165 and guides 113, 163. Transport means 160 further comprises take-up roller 164. Take up roller 164 is movably mounted within the system. The take-up roller 164 is mounted to move up and down between a first upper position 164A and a second lower position 164B. The take up roller 164 is provided to maintain tension of the medium as it is transported through the apparatus through printing and transfer to the build plate. Take up roller 164 facilitates the simultaneous operation of the building and the printing. A pick-up roller 165 may also be provided for the pick up of waste material 510.

The transport means 160 may further comprise a sprocket feed means 165 or nip roller 166 for use with paper configured for sprocket feed or transport. It will be appreciated that suitable alternatives may also be provided to sprocket feed or nip roller. It will be appreciated that different arrangements of rollers and guides may be provided and that additional or alternative guides or rollers may be provided in conjunction with the transport means 160 or feed mechanism 165 for transporting to medium of the exemplary arrangement. It will be appreciated that additional drive rollers, pinch rollers, nip rollers or guides may be provided at selected location on the transport path, as required.

The collation or build module 300 provides for the building of the 3D object by layered object manufacture. The build module 300 comprises a build plate 310, adhesive dispensing means 320, cutting means 321, and a heated plate 330. The object is built in build chamber of module 300.

The adhesive dispensing means 320 and cutting means 321 may be mounted to a multifunctional head 322. The adhesive dispensing means and cutting means are mounted and operate in an area above the build plate. The adhesive dispensing means and cutting means may be, for example, mounted on an X-Y frame for movement over the build plate 310, as required. It will be appreciated that suitable alternative arrangement which allow for the adhesive dispensing means to operate above the build plate may also be used.

The build plate 310 is moveable between a first raised and second lowered position within the system. The build plate it lowered as the successive layers of media are added to the build plate 310 to build the object. Cutting means 321 and adhesive dispensing means 320 are configured to provide cutting, of the object form and application of adhesive to the medium 500 forming media layer 701 of the object. Cutting means 321 is configured to make a series of cross-hatch cuts in the medium and cut out an outline section of the medium. The first media layer 701A may be provided to a build plate 310 or other base layer to which adhesive has been applied. Subsequent layers 701A, 701B etc are built successively thereon.

The transport means 160 provides for the transporting of the medium through the apparatus, for printing of the first and second sides, for transferring a media layer, already printed, as required, from the roll to the build module and for cutting and application of adhesive. The transport means 160 is controlled to move the medium, forwards, backwards or to stop movement as required for the different operations. The feed roller 161 is configured to rotate clockwise and counter-clockwise, as required, to allow position of the medium within the transport path, for example, for printing to be controlled. To provide for continuous operation, a portion of medium 500 to which first image 600B has been printed at the first print station 210 is transported through the system, take-up roller and drive roller provide control to locate the correct portion of medium 500 at the second print station 220 for printing of the second image 600A of the back to back pair (600A, 600B).

This transport means also provides for correction of position and/or skew if required so that the image or mark/s to be printed on the second side of the medium are located correctly to those printed on the first side.

The medium 500 of roll 501 in the exemplary arrangement comprises paper in continuous roll form configured for feeding via the sprocket feed mechanism 165. It will be appreciated that various forms of sprocket feed paper may be provided, for example, paper having one or two margins configured for transport by a sprocket feed mechanism of corresponding type. In the case that a sprocket feed roll of paper or similar is used, it will be appreciated that the feed mechanism may be used to provide control of placement and alignment of the medium throughout the transport path 140 from start to finish through the apparatus 100. As noted above alternatives may be provided for example "nip" roller(s) 166.

The transport path 140 is described in more detail. In the exemplary arrangement paper is transported to the second print station via a path external to the guide 113. The guide 113 is arranged to ensure that the transport to the second print station does not interfere with the feed of medium 500 from the roll 501. In addition, the guide 113 serves to direct the medium towards the second print station 220. The guide 113 in turn, inverts the roll to present the other side for printing.

Referring to FIGS. 2 to 7, the process for 2D and 3D printing in a continuous in-line printing according to the present specification is described.

Figure 2:
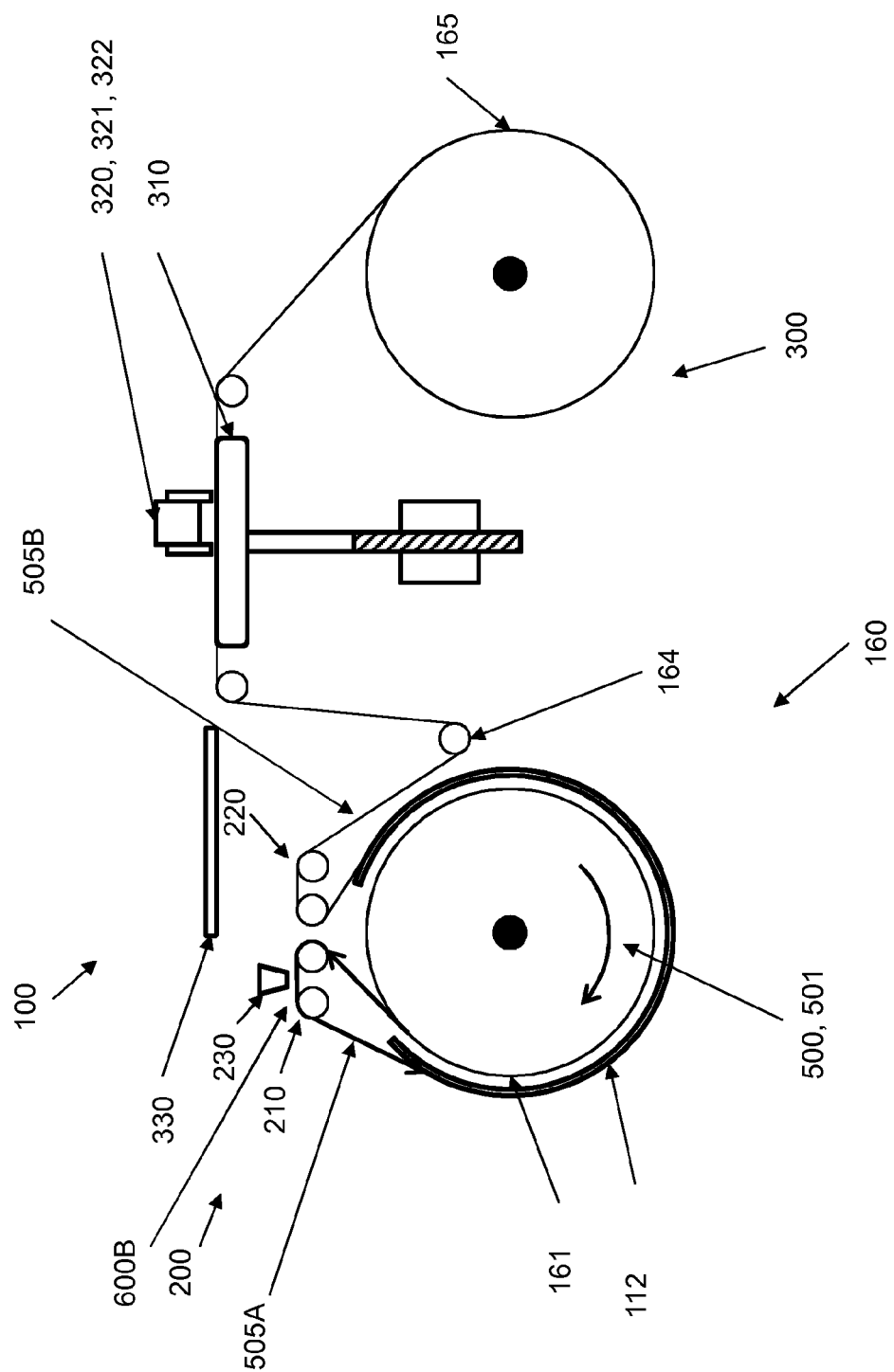
FIG. 2 is a cross-sectional side view of the printing apparatus of FIG. 1B showing printing at a first station of the underside of the medium according to an embodiment of the present specification.

FIG. 2—Step 1: Underside Ink Printing

Figure 11:
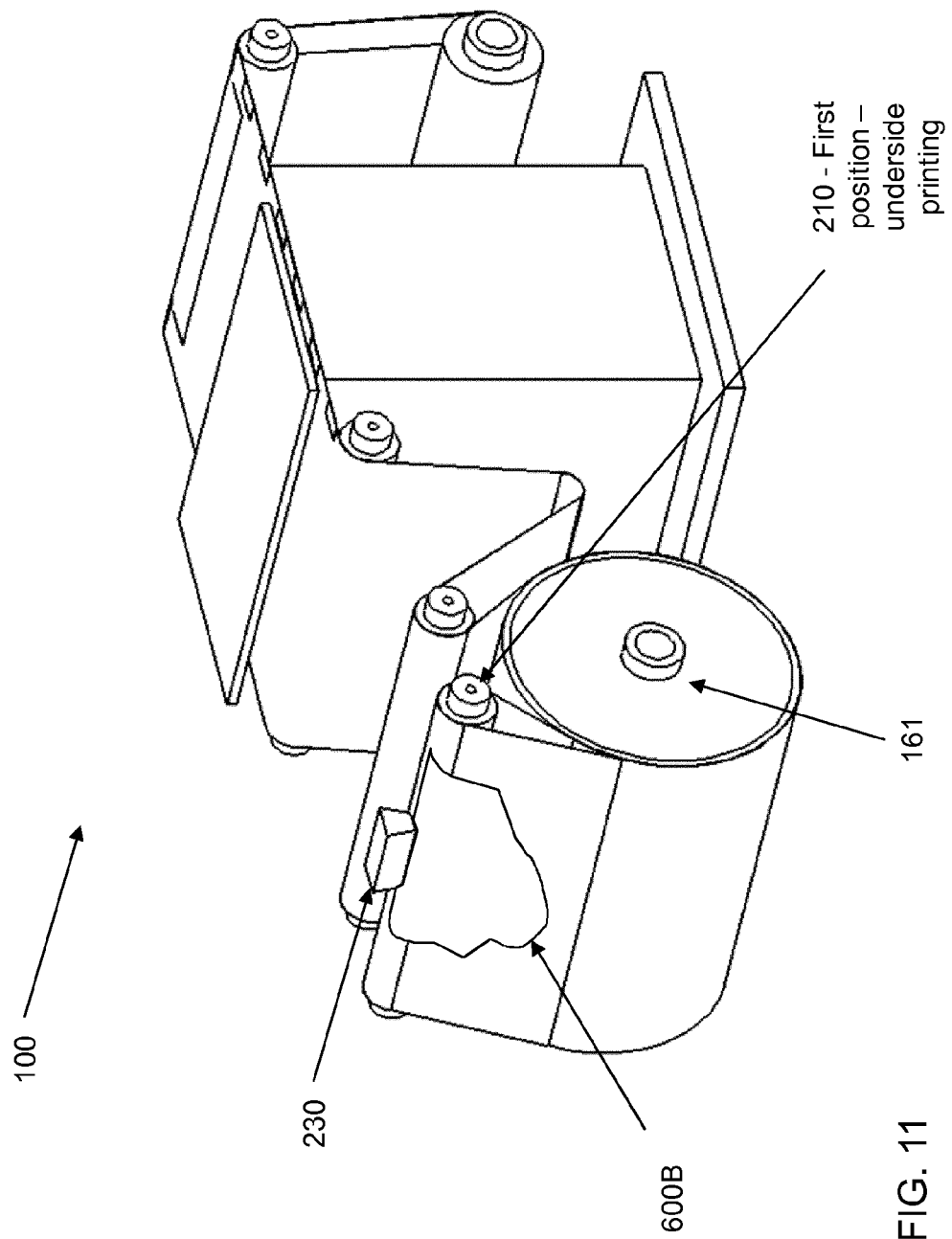
FIGS. 11 and 13 are perspective views of the printing apparatus of FIG. 2.
Figure 12:
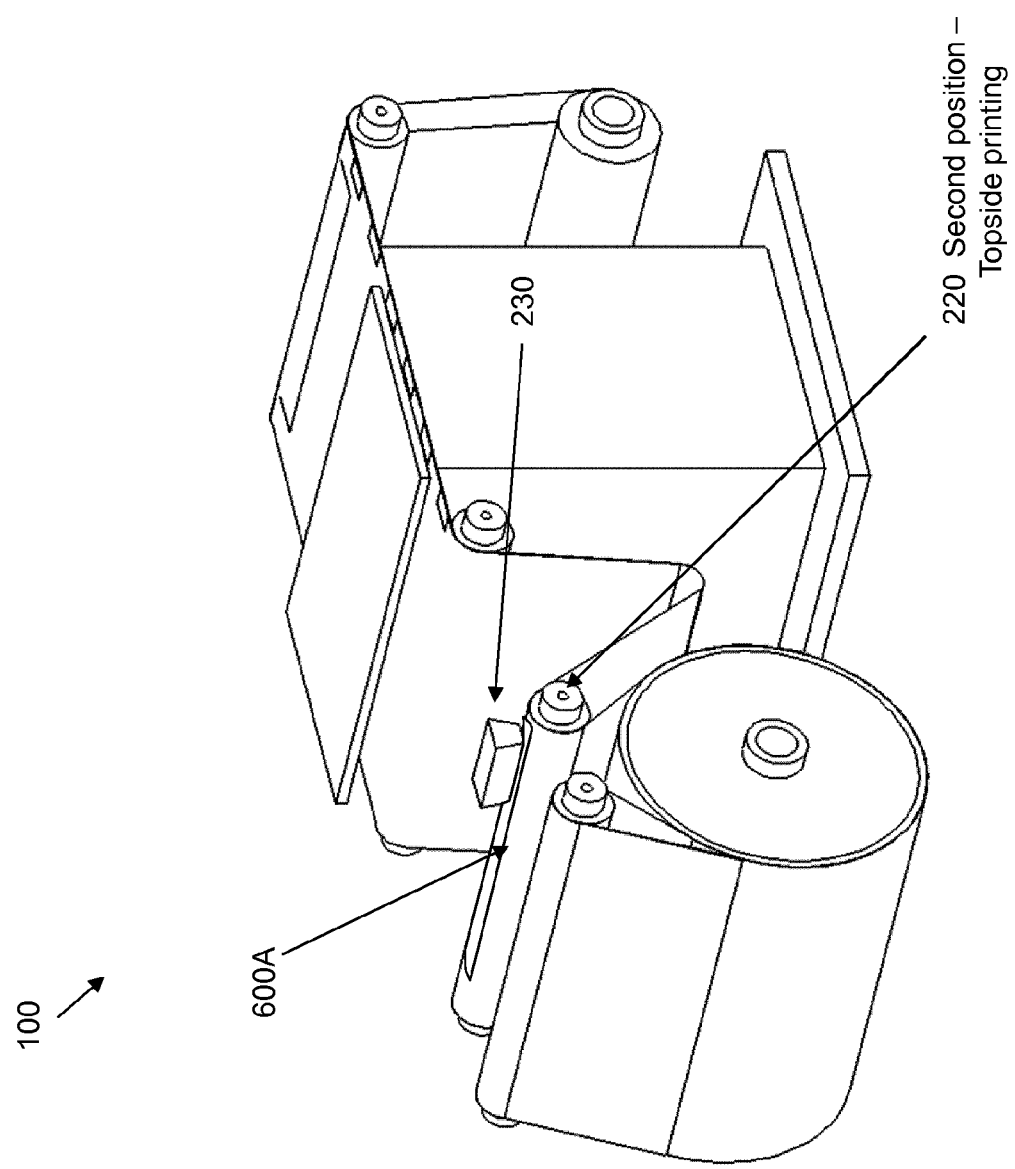
FIGS. 12 and 14 are perspective views of the printing apparatus of FIG. 3.
Figure 13:
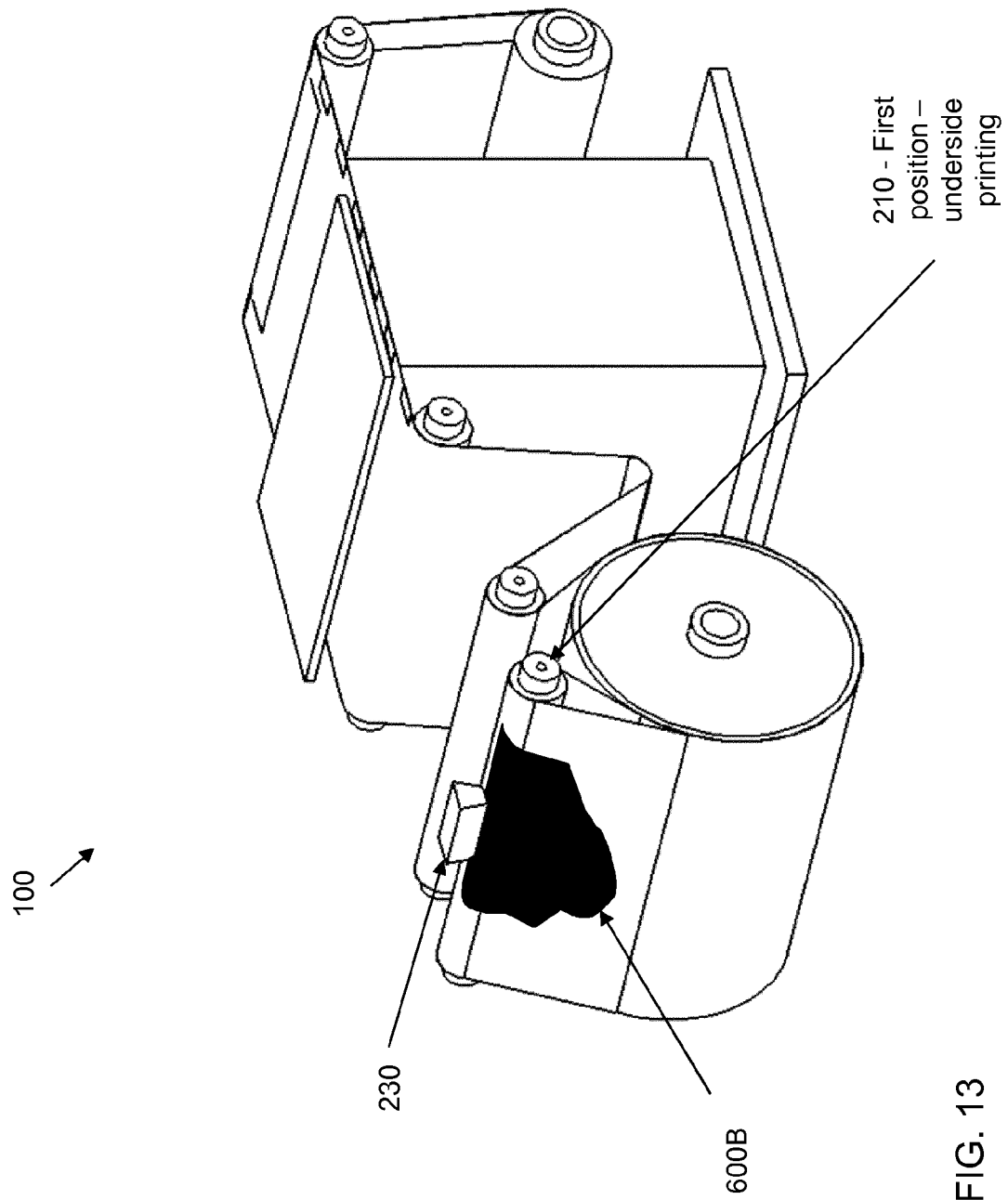
Figure 14:
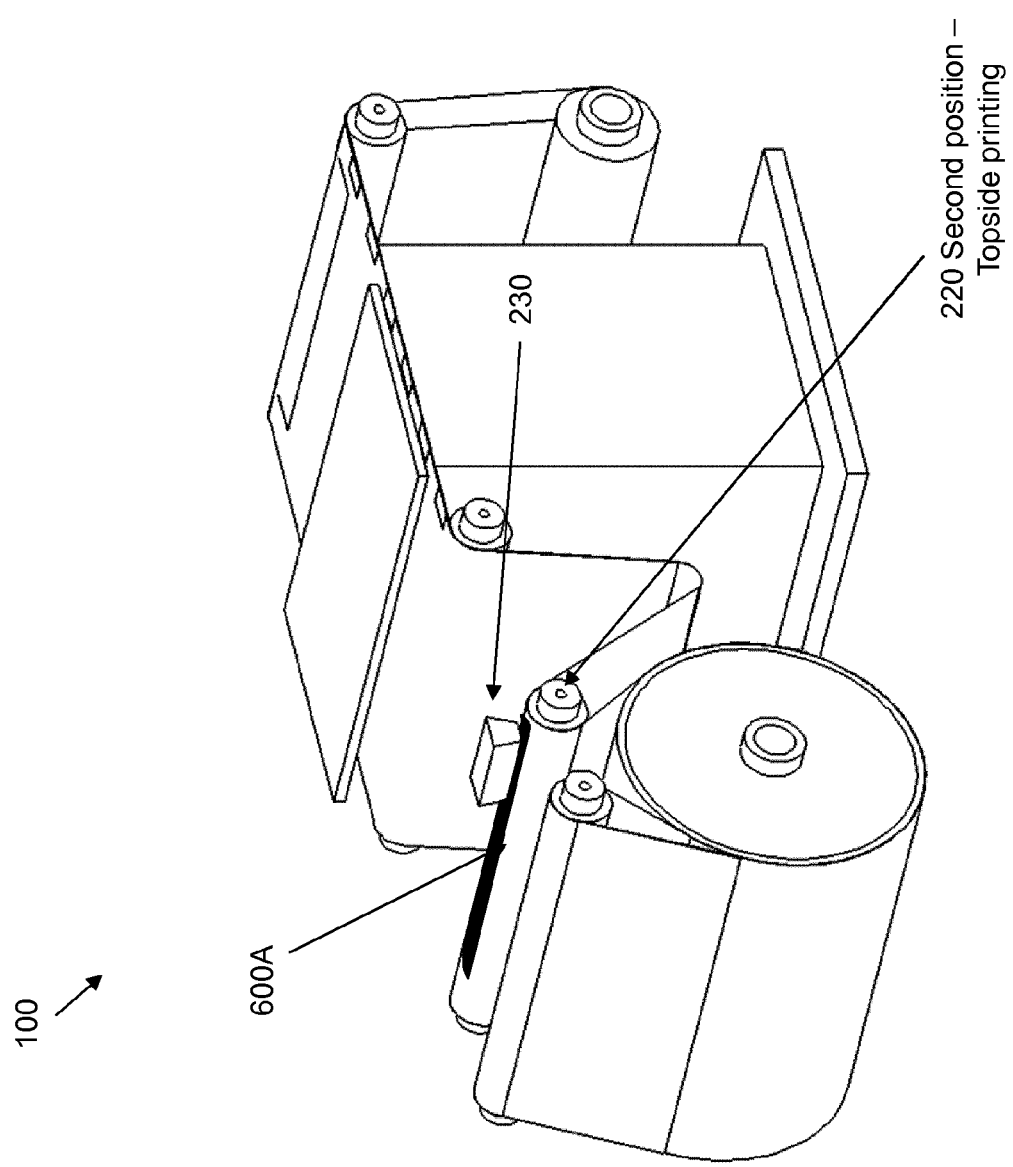

Referring to FIG. 2 and related perspective views FIGS. 11 and 13 the step of printing the underside image 600B, according to an exemplary arrangement of the present specification is described.

Paper is fed from the feed roller 161 so that the underside 505A of the medium 500 is presented to the print head 230. The underside image 600B is printed. The underside image is the first image of an image pair to be printed back-back on the under and top side of the medium 500.

In a further exemplary arrangement fiducial mark 605 may be printed along with the first image 600B. The fiducial mark 605 is provided to show where the image is located. The fiducial mark 605 may include positional information or other identification information relating to the image printed on the medium or an image identifier. Fiducial marks 605 may be sensed by sensing means 170 to assist in locating the topside or second image 600A in the correct location relative to the corresponding underside image 600B, or further to detect skew or location errors.

The system 100 may further comprise skew adjustment means 180. If the sensing means 170 when sensing the fiducial mark 605, senses a skew in the mark, the system responds to correct the skew before printing the topside image 600A.

Sensing means 170 may be provided at different locations throughout the transport path. For example sensing means 170 may be located at the second print location and at the build plate.

Sensing means 170 may, for example, be provided near the build plate or incorporated to the multifunctional head 322.

The medium 500 is inverted as it is transported from first print station 210 to second print station 220. The inversion allows the medium to be printed on both sides in a continuous in-line printing process, in this exemplary arrangement while using only one print head.

Print head 230 is configured to print at least a portion of a first surface 505A of the medium as it passes the first printing station 210. The same print head 230 may be configured to print at least a portion of the second surface 505B as it passes the second print station 220. In the exemplary arrangement of FIGS. 1-3 first and second print stations are located spaced apart on a common transport axis. The print head 230 is controlled to move between first and second print stations, as required.

In an alternative arrangement, a second print head 230' may be provided to allow simultaneous printing of the first and second sides 505A, 505B of the medium 500 i.e., simultaneous printing at both the first print station and the second print station of first and second sides of corresponding front and back portions of the medium.

Figure 3:
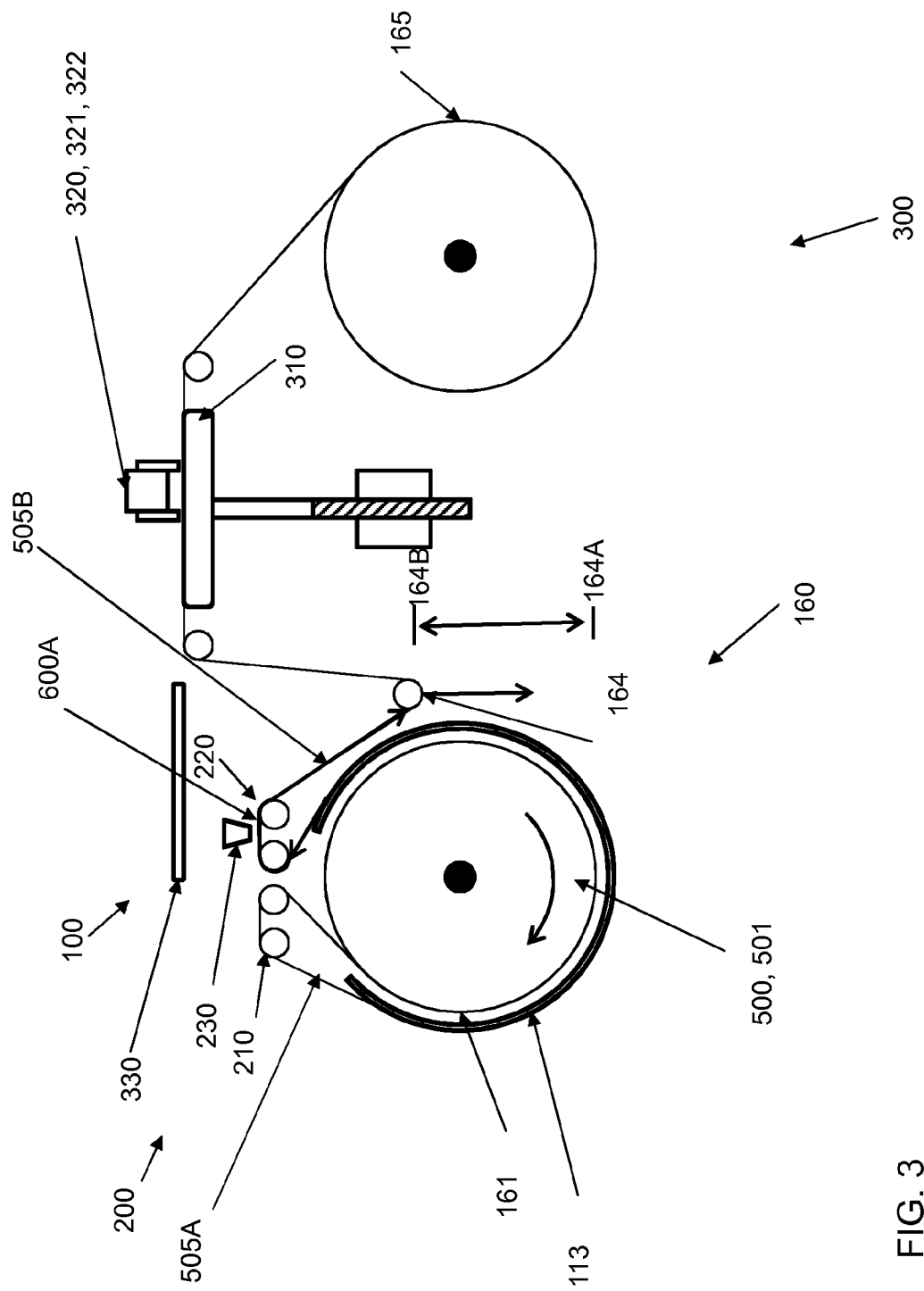
FIG. 3 is a cross-sectional side view of the printing apparatus of FIG. 1B showing printing at a second station of the topside of the medium according to an embodiment of the present specification.

FIG. 3 Step 2: Topside Ink Printing

Referring to FIG. 3 and corresponding perspective view images 12 and 14 a step of printing the topside image 600A, according to an exemplary arrangement of the present specification is described.

The paper continues around the outside of the feed roller 110 and feed roller housing 113 from the first print station 210 so that the top side 505B of the paper is presented to the print head 230 at the second print station 220.

In a further arrangement, if as described above, a fiducial mark 605 has also been provided on the underside 505A sensor 170 may detect the location of the fiducial 605 from the underside printing and provides instruction to the printer as to where to locate the topside image 600A of back to back image pair 600A/600B.

As the medium 500 is fed through the system 100 in the direction of the build module 300 the take up roller 164 moves downwardly to enable the different operations of printing, cutting and gluing to run simultaneously. The 2D printing or ink printing steps and the cutting & adhesive dispensing steps are independent.

The exemplary arrangement of the drawings illustrate the advantageous use of a single print head 230 while still being able to print on both sides of a medium 500 provided in roll format 501.

The feed roller 161 as discussed above is configured to run in the clockwise and the opposite anti-clockwise directions for example to bring the medium under the print head 230. The feed roller 161 is configured to rotate in the forward (anti-clockwise) and backward (clockwise directions) to provide increased flexibility and control of the paper feed and transport through the system. As the feed roller 161 rotates the take-up roller 164 will move up and down correspondingly. In the exemplary configuration shown having a single print head 230, as the medium passes through the first station 210 for printing, the medium has also moved through the second print station 220 with no print head available The use of the feed roller 161 and take up roller 164 when using one print head 230 provides for location of the medium at the second print station 220, as required. After printing at the second printing station 220, the medium 500 continues to be fed to the region above the build plate 310.

Figure 4:
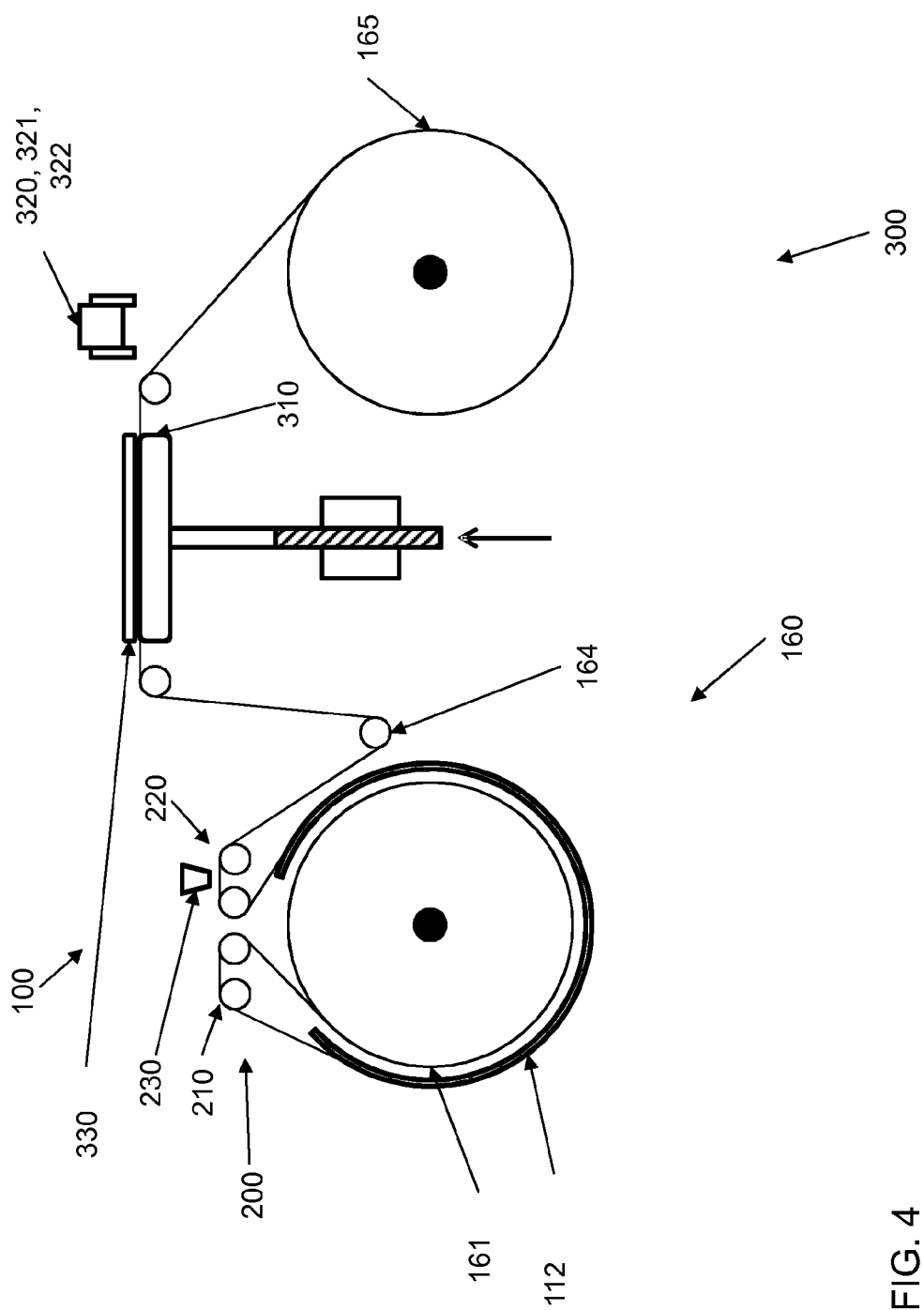
FIG. 4 is a cross-sectional side view of the printing apparatus of FIG. 1B showing pressing of the medium with the heat plate according to an embodiment of the present specification.
Figure 5:
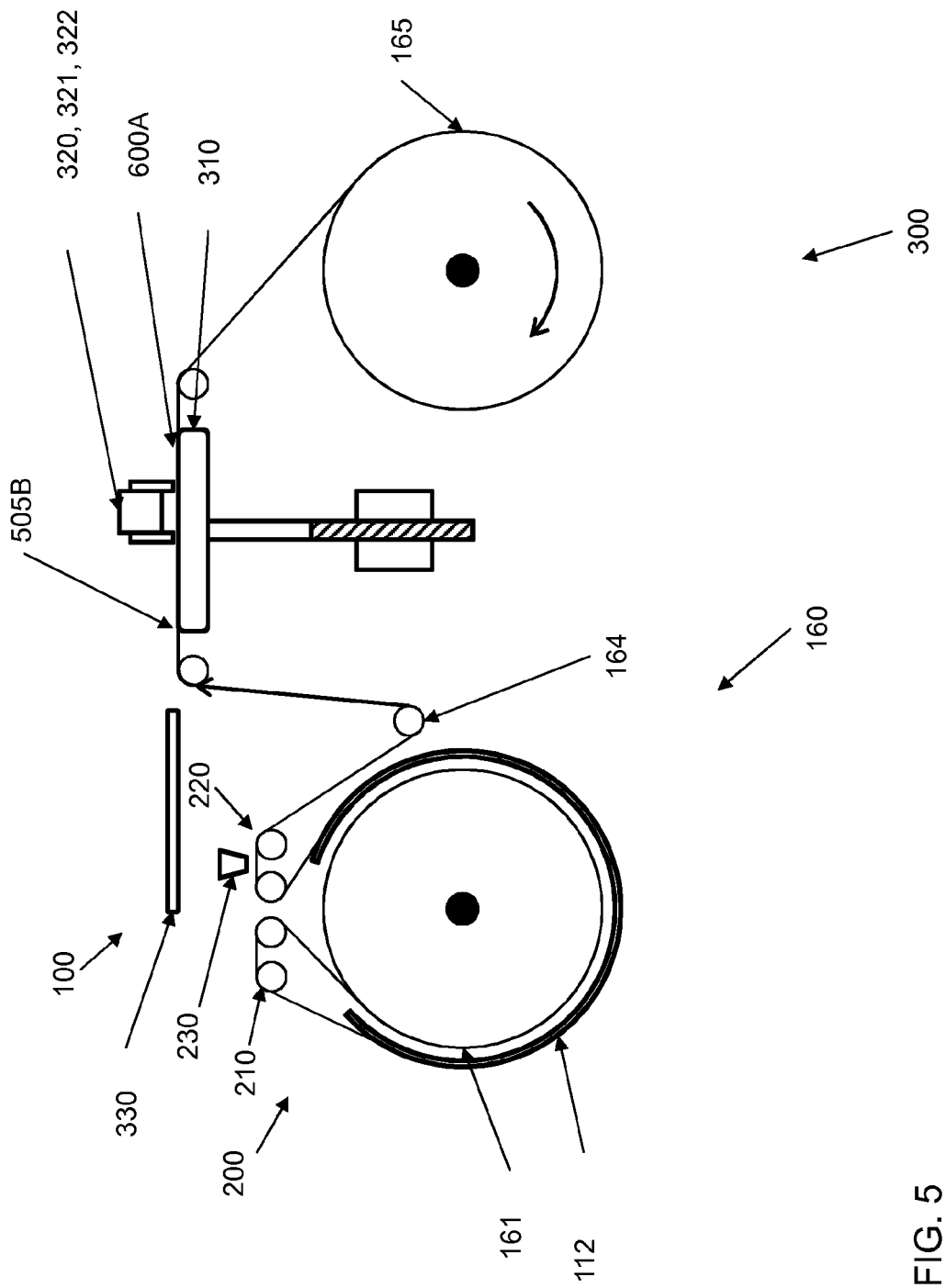
FIG. 5 is a cross-sectional side view of the printing apparatus of FIG. 1B showing profile cutting of the medium at the build location according to an embodiment of the present specification.

FIG. 4 and FIG. 5 Paper Transfer to Build and Press

Referring to the exemplary FIG. 4 transfer of medium 500, in this exemplary arrangement of the drawings, paper, (with the previously applied duplex images) is transferred to the build platform. In this step, the medium is cut to form the layers 701A (701B etc.) of the build object 700.

Further, if as described above fiducial mark 605 was printed with the first image to the underside of the medium, to instruct the printer where to locate the topside image, such may be utilised to instruct the apparatus 100 how far to advance the roll 501 so that layer placement on the build plate is very accurate.

After the new layer 701A (previously printed page) is placed over the build plate 310, the heat plate 330 is moved into a position above the build plate 310 and the build plate presses into the heat plate 330 making positive contact between the top layer 701A and the part 700 (or possibly base layer or base plate for first media layer) being built on the build plate. The heat plate 330 then moves away to enable the adhesive dispenser 320 and cutting means 321 to move back and start working on the next layer 701B.

Figure 6:
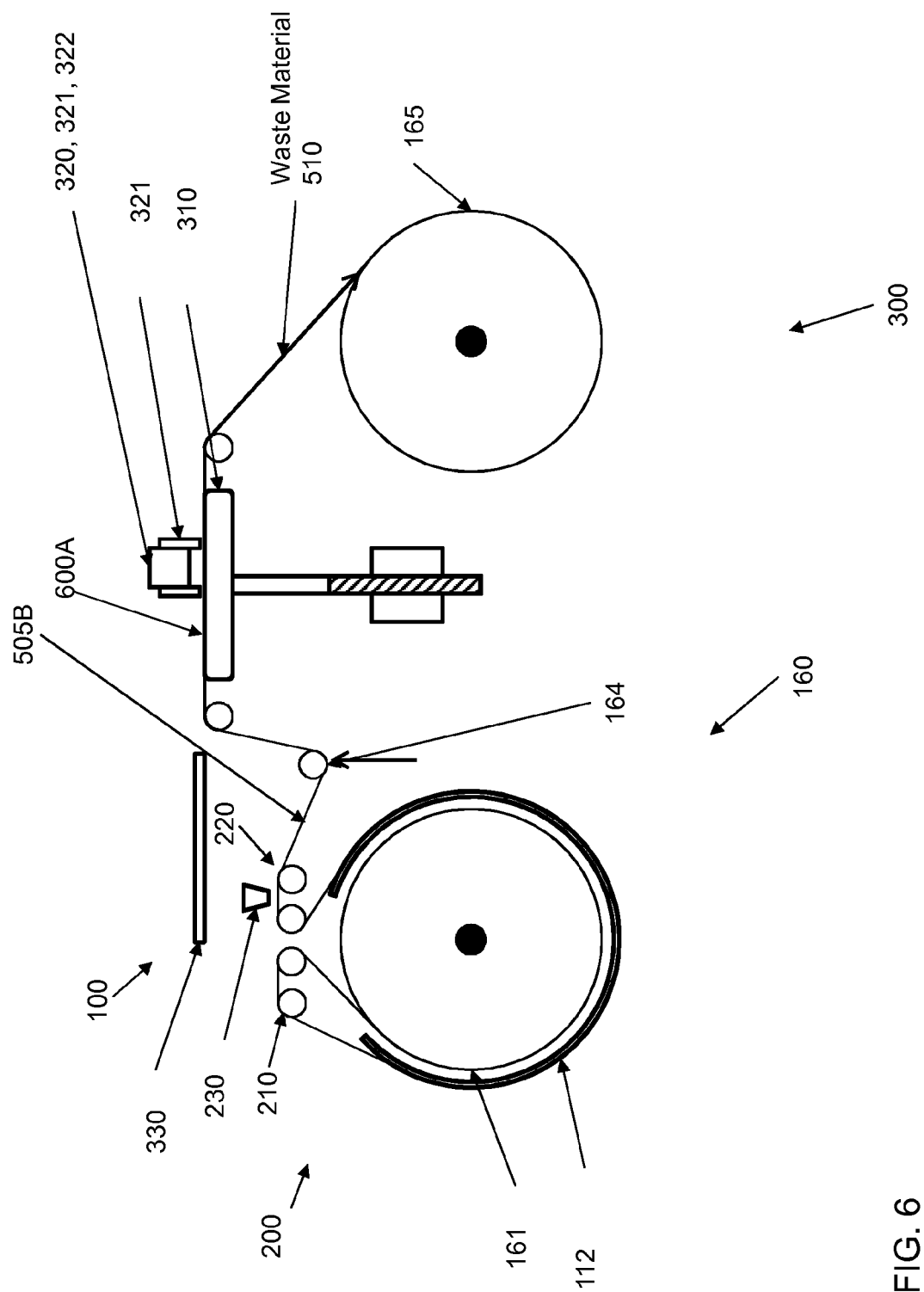
FIG. 6 is a cross-sectional side view of the printing apparatus of FIG. 1B showing adhesive application to the top side of the medium, defining the upper side of the build layer according to an embodiment of the present specification.

FIG. 6 Profile Cutting

As the printing module 200 is printing on the underside 505A and top side 505B of the roll of medium 500 (as in steps 1 & 2) to prepare a second or third layer (701B or 701C) of the build object. In the exemplary arrangement, the cutting means 321 is configured to cut the first media layer 701A of the build object 700 from medium 500, which in the exemplary arrangement of FIG. 4 is the top layer 701A on the build plate 310.

Once the profile is complete, the cutting means 321 cuts out the build layer 701A from the roll of paper 500. In the exemplary arrangement adhesive is applied after the profile cuts are made. Thereafter the waste material 510 is indexed to the pickup roller 165.

The take-up roller 164 is configured to enable the cutting of a layer 701 of the build object 700 to take place without being effected by the ink printing process. As waste material 510 is wound up, the take-up roller 164 is configured to rise to take up any slack and to maintain the necessary tension in the medium 500.

The arrangement of the present specification is highly efficient and reduces waste. The size of each media layer cut out from the medium varies depending on the requirements of the build. For example, it is not required to place an entire sheet for example an A4 sheet on the build to provide a media layer instead the size of each media layer profiled from the medium is adaptively varied.

Figure 7:
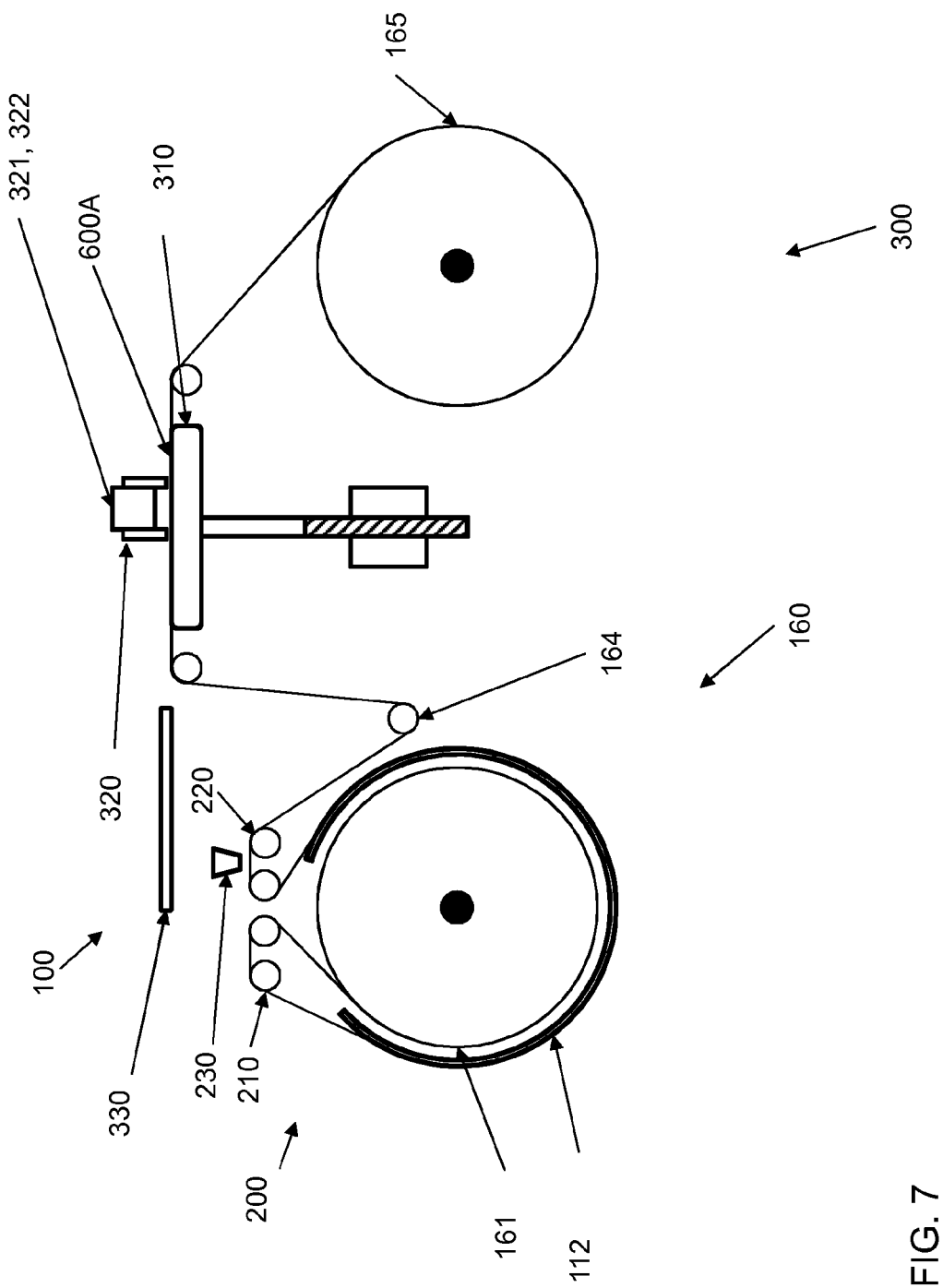
FIG. 7 is a cross-sectional side view of the printing apparatus of FIG. 1B showing transfer of the build layer to the build location according to an embodiment of the present specification.

FIG. 7: Adhesive Application

Referring to FIG. 7 as described above once the profile is cut the adhesive is applied to the top surface of the paper. The adhesive in the preferred arrangement is applied before indexing. Again, all this is happening while the printing process is running concurrently.

While the sequence of drawings 4 to 7 illustrate steps for the transfer, cutting and adhesive application of media layers of an object, of an exemplary arrangement of the specification, it will be appreciated that an alternative sequence may also be used.

Figure 8:
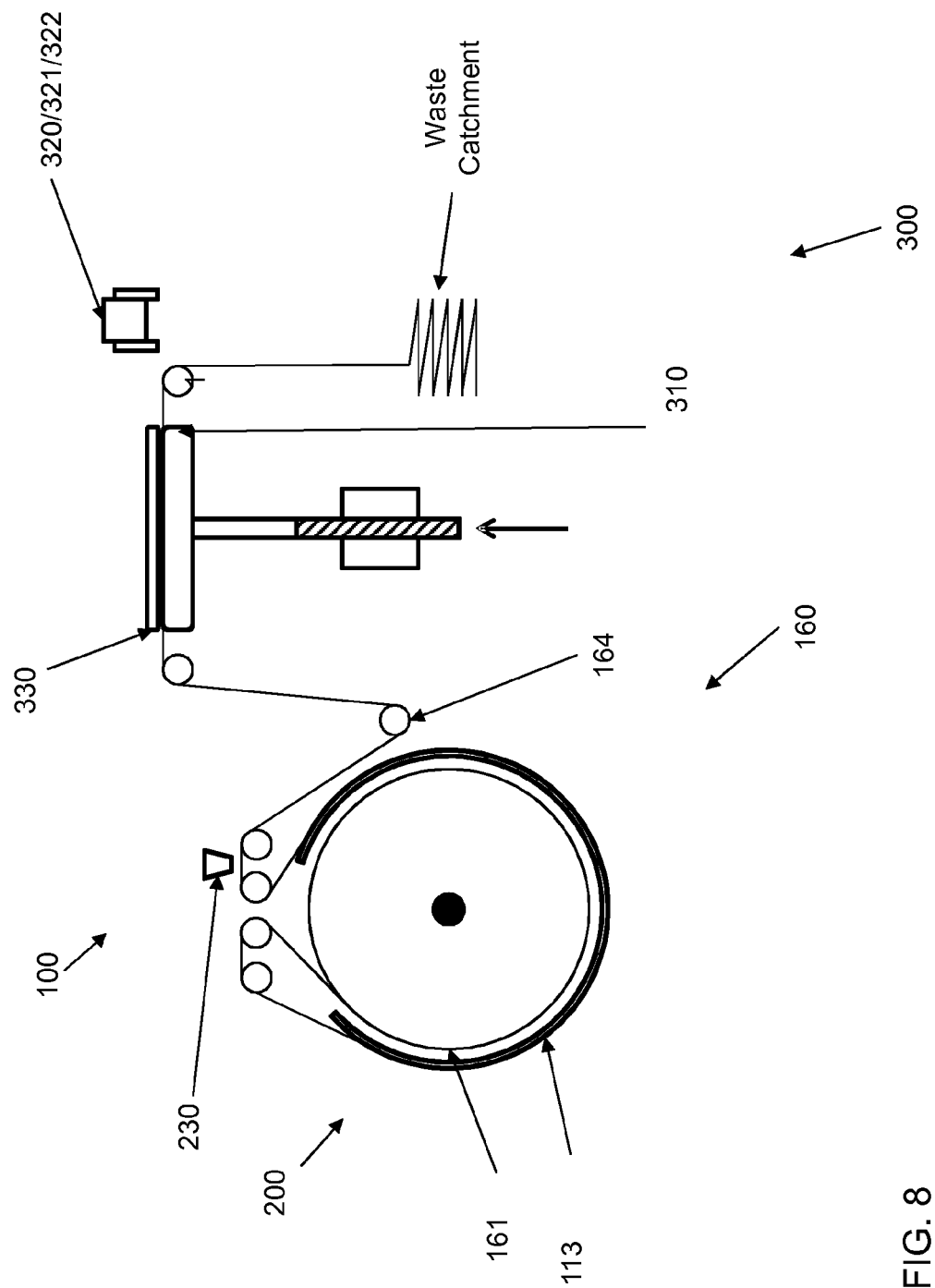
FIG. 8 is a cross-sectional side view of an alternative printing apparatus according to the present specification which does not include a pick up roller.

Referring to FIG. 8 an alternative arrangement according to the present specification is described. In the arrangement of FIG. 8, no pick up roller 165 is provided. Instead of using a pickup roller, the waste material 510 could be simply collected as it exits from the machine.

Figure 9:
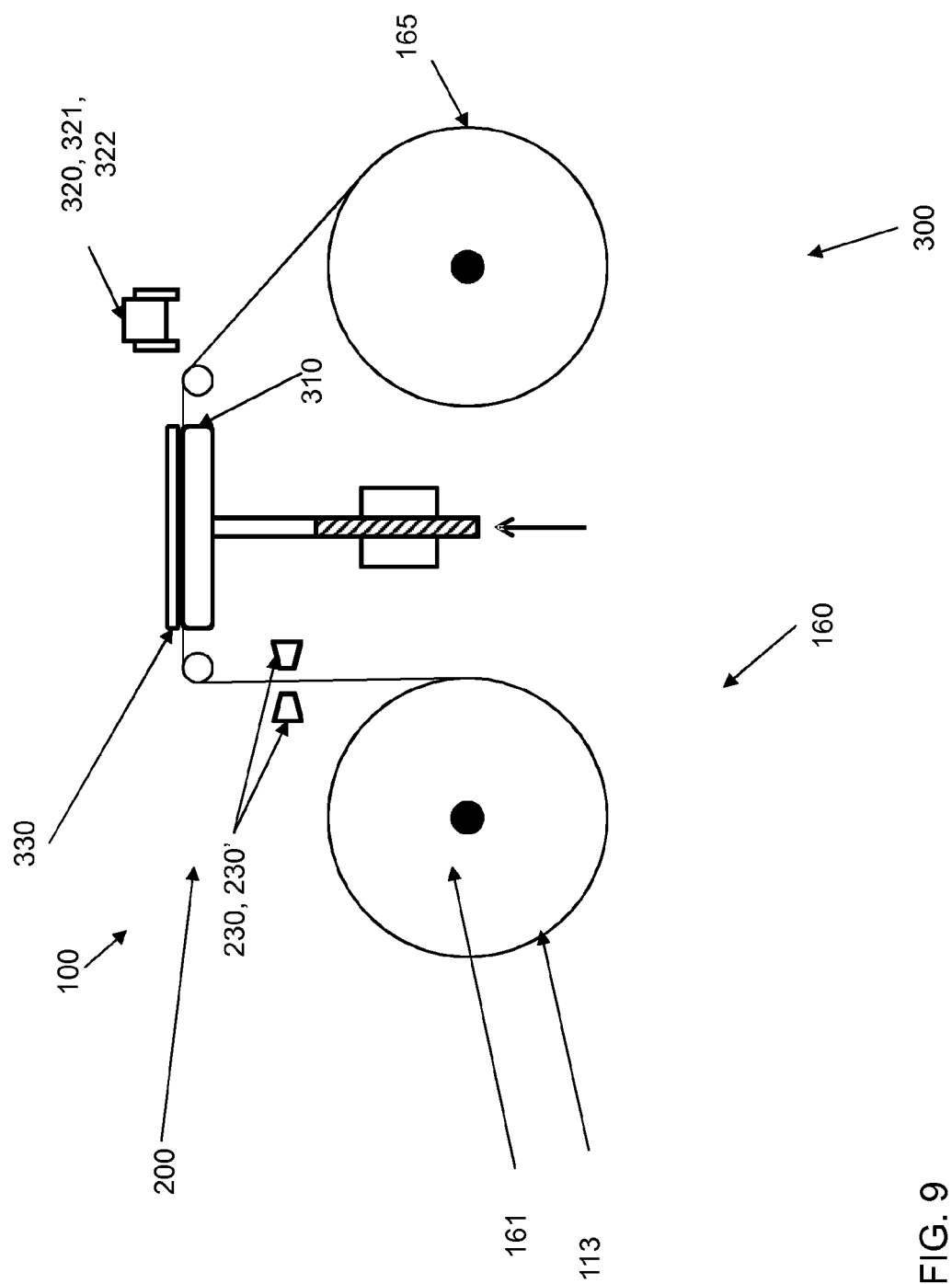
FIG. 9 is a cross-sectional side view of an alternative printing apparatus according to the present specification with two print heads arranged for simultaneous printing of the medium.

Referring to FIG. 9 an alternative arrangement according to the present specification is described. The arrangement of FIG. 9 is an exemplary arrangement which provides simultaneous Duplex printing of a media layer. In this arrangement, two print heads 230 and 230' are provided. The medium 500 can be taken from the feed roller 161 and transported to pass vertically between two print heads 230 and 230' operating in a horizontal configuration printing in duplex simultaneously.

While in the arrangement of FIG. 9 as illustrated the print heads are arranged for a vertical feed and the print heads are arrangement to operate in a horizontal configuration, it will be appreciated that the feed could be vertical and the printing in a horizontal configuration, for example.

Figure 10:
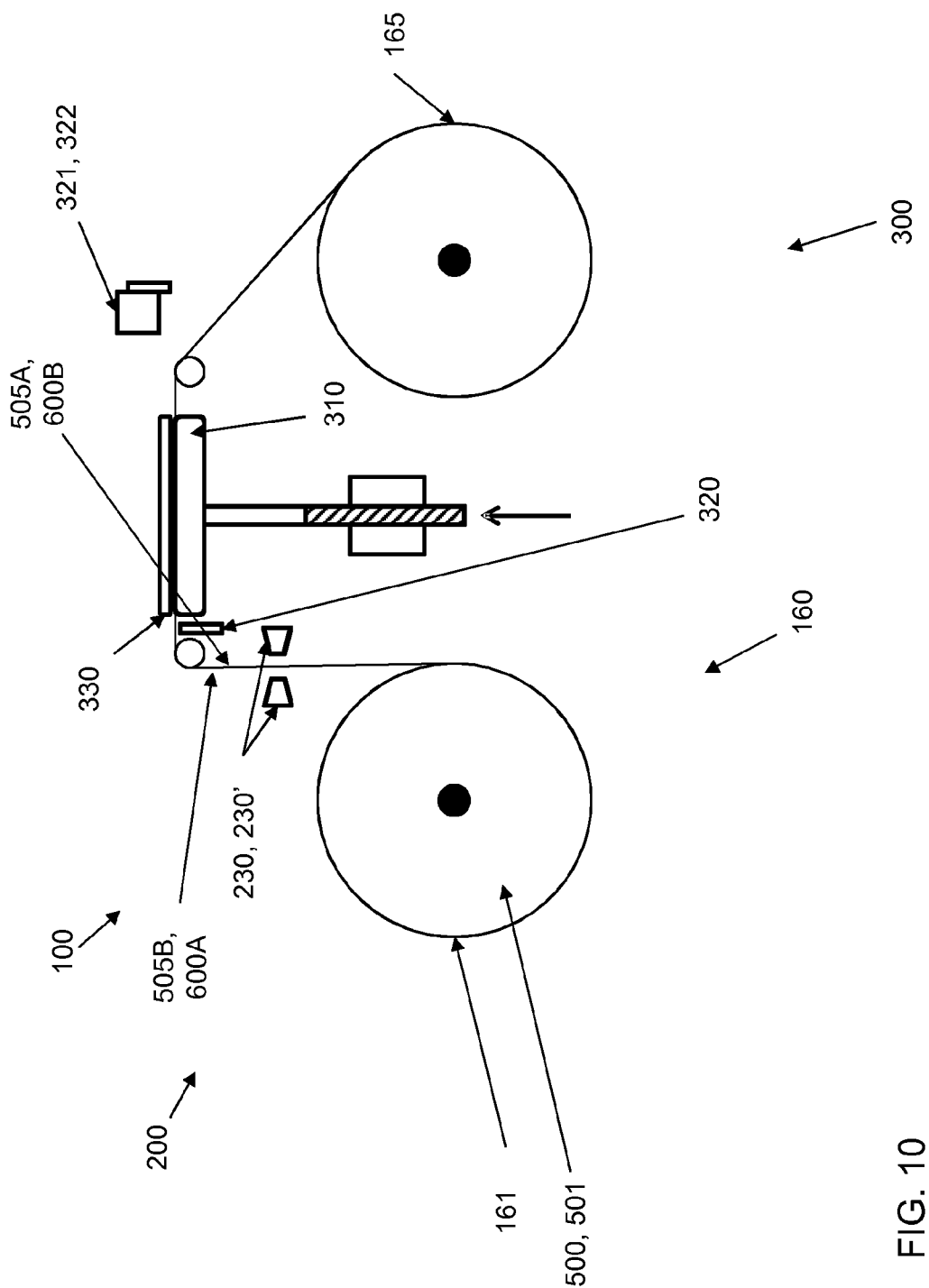
FIG. 10 is a cross-sectional side view of an alternative build module according to the present specification with adhesive dispensing means located to the upstream side of the build plate for application of adhesive to the underside of the medium.

Referring to FIG. 10 an alternative arrangement according to the present specification is described. In this exemplary arrangement, the adhesive dispensing device 320 is positioned underneath the roll medium as the medium or sheet is being fed to the build plate. This arrangement advantageously removes the extra weight attributable to the adhesive dispensing device from the multifunction head 322 and speeds up the overall process as it applies the adhesive as the medium or sheet is being transferred.

Figure 15:
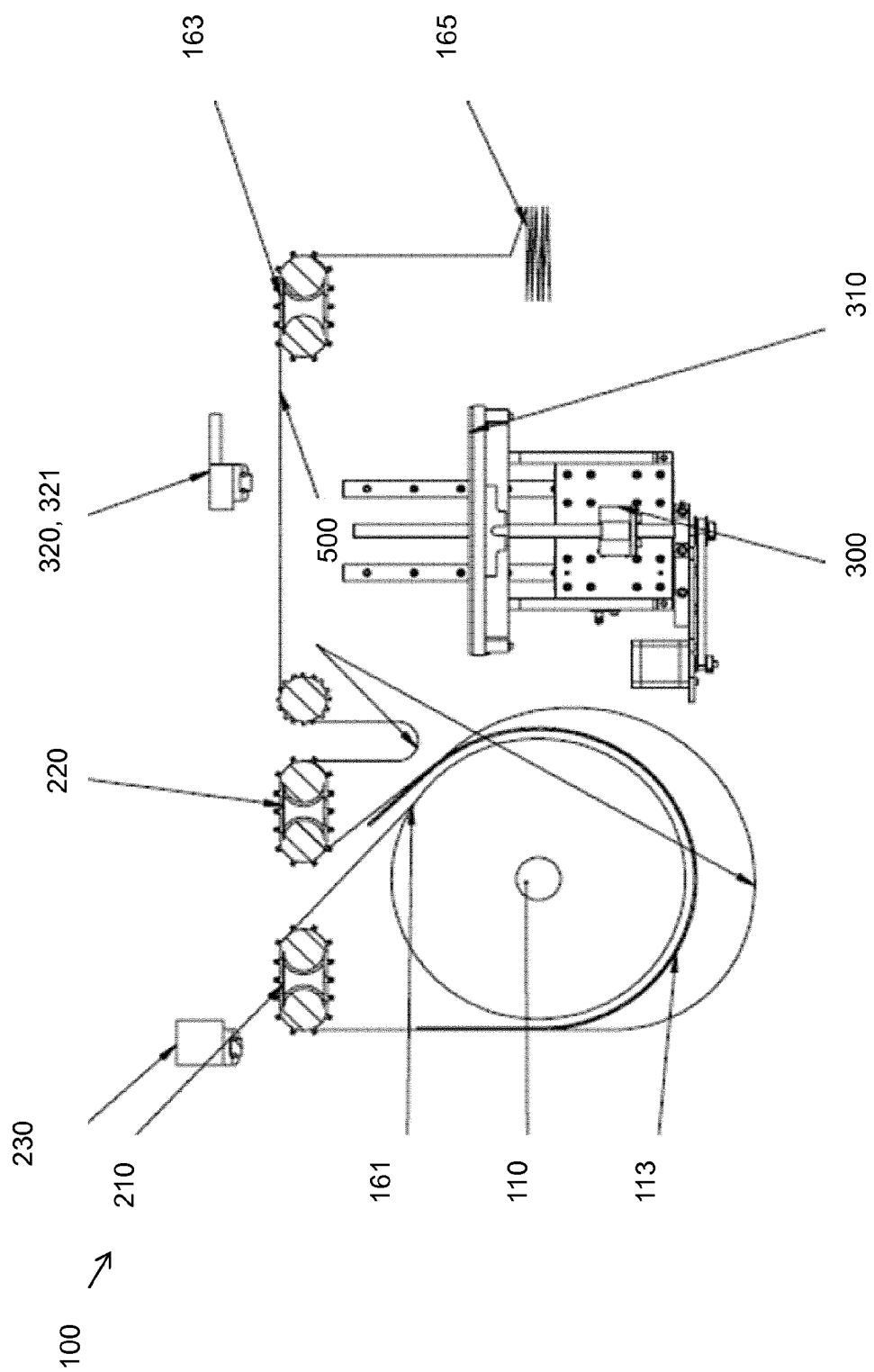
FIG. 15 is a cross-sectional side view of an alternative printing apparatus according to the present specification illustrating an alternative arrangement for the feed roller and feed of the medium to the first print station.

Referring to FIGS. 15 and 16 an alternative arrangement of the printing apparatus 100 according to the present specification is shown. The apparatus 100 similar to that of FIGS. 1 to 14 includes in-line a printing module and a build module. Transport means 160 is provided to convey the medium to be printed and used to form the layers of the build object from the input through printing and to the build module. Transport is a continuous in line transport.

The arrangements of the present specification advantageously provide improved alignment between images on the first side and second sides of a media layer for 3D printing.

The arrangement of the present specification provides an improved desktop 3D printing apparatus. The apparatus is advantageously configured to provide 2-D printing in single-side or duplex format and 3-D printing of a medium in a continuous in line process. It will be appreciated that in the art 3D printing refers to the SDL process. As described herein, the media to be printed, paper, in the exemplary arrangements of the present specification is provided to the apparatus in sheet or roll format, paper is transported for duplex printing and directly to the build plate for the SDL process.

The arrangement of the present specification may advantageously be used for example for 3D printing of photographs or contour maps. The object manufactured by 3D printing has precision colour to specification throughout the layers of the object. The arrangements of the present specification provide for improved control of colour on first and second surfaces of each layer. The approach provided is high precision and the 3D objects are of improved quality.

Duplex alignment for 3D printing provides an improved 3D object. While duplex alignment is not an issue for text it has a large effect on the image and colour quality. Therefore the system of the present patent specification provides improved colour results in 3D printing.

Further problems arise including the lag in the offset printing process when doing a one off print job as it is necessary to wait until the sheets for the print job are pre-printed.

The apparatus of the present specification which provides in one aspect a printing and build module in a single unitary housing provides for an improved 3D printing apparatus which is compact and efficient.

In another aspect there is provided a printing module for colour 3D printing. The printing module provides for a highly accurate 2D colour printing of media layers for delivery to a build module for assembly of individual media layers to provide a 3D object.

The duplex printing module 200 according to the present embodiment may be usefully applied in the context of 3D printing processes. When a media layer is printed from both sides, less image spread occurs, thus providing better image feature dimensional control. No colour interaction between printed layers occurs, which preserves the fidelity of the desired image. However, the duplex printing module according to the present embodiment may be usefully applied in other duplex printing applications where it is important to align images printed on first and second sides of the media layers.

The arrangement of the present specification provides an efficient process.

The invention claimed is:

1. A desktop printing apparatus for 3-D printing an object comprising:
a print module for printing a medium, the printed medium defining a media layer of the object, and a build module for building a 3D object from a plurality of printed media layers, arranged in-line in a single integrated apparatus, further comprising transport means defining a medium transport path within the apparatus from a medium input to the build module;
wherein the print module comprises first and second print stations, and a print heads configured to print an image on a first side of the medium at the first print station and to print an image on the second side of the medium at the second print station and wherein the first and second print stations are located spaced apart along the transport path;
wherein the build module comprises a build plate, cutting means, bonding means and adhesive dispensing means;
wherein the transport means comprises:
a housing defining on a first inner side an internal support for receiving the medium in roll form, and, on a second outer side an external guide to direct the medium from the first print station to the second print station; and
a sprocket feed and guide rollers arranged to
transport the medium directly from the medium in roll form located in the internal support to the first print station for printing on the first side; and
to transport the media layer from the first print station via the external guide to the second print station;
wherein the media layer is inverted at the external guide such that the second side of the medium is presented to the second print station.

2. The apparatus of claim 1, wherein the build module configured to manufacture the 3D object by selective deposition lamination (SDL).

3. The apparatus of claim 1, wherein
the print module and build module are arranged in-line in a single integrated apparatus, and
the transport means is configured to transport the medium from an input to the print module and to the build module in a continuous in-line transport operation.

4. The apparatus of claim 1, the print module and build module are configured to operate simultaneously, as the transport means transports the medium through the apparatus.

5. The apparatus of claim 4, wherein the print module and build module are configured to operate simultaneously on different portions of the medium, which define different media layers of the object, as the transport means continuously transports the medium through the apparatus.

6. The apparatus of claim 1, wherein the print module and build module operate independently, as the transport means transports the medium continuously through the apparatus.

7. The apparatus of claim 1, the print module configured for duplex printing of the medium, wherein a first image of an image pair to be printed on a media layer is printed on a first side of the medium and a second image of the image pair is printed on the second side of the medium back to back to the first image to define a printed media layer of the object.

8. The apparatus of claim 1, the print module further configured to print a fiducial mark on a first side of a medium, wherein the fiducial mark comprises a mark configured to provide information about the image printed on the first side of the medium, wherein the mark is a locator mark, or an image identifier to identify the image from the sequence of images for printing.

9. The apparatus of claim 1, the transport means further comprising a feed mechanism and controller, the controller configured to control transport of the medium through the apparatus and the location of different portions of the medium in the apparatus.

10. The apparatus of claim 1 further comprising sensing means for sensing location of a portion of the medium and for providing output to the controller for controlling or correcting the location of the medium.

11. The apparatus of claim 1, further comprising
sensing means for sensing an image, or a portion of the image, or fiducial mark printed on a first side of the medium; and
the sensing means providing output to the controller for controlling the location of the medium for controlling the printing of a second image on the second side of the medium back to back to the first image.

12. The apparatus of claim 9, wherein the controller is configured to control the apparatus to correct any detected skew or location error.

13. The apparatus of claim 1, the transport means includes one or more of a feed roller, drive roller, pinch roller, nip roller, and guide means.

14. The apparatus of claim 1 wherein the transport means comprises a feed roller configured to run in the clockwise and opposite anti-clockwise direction to control the location of different portions of the medium within the apparatus.

15. The apparatus of claim 1, the transport means further comprising a take-up roller to maintain the tension of the medium as it is transported through the apparatus and through the print and build modules and to provide accurate location of different portions of the medium at the print module and at the build module respectively.

16. The apparatus of claim 1, wherein the medium transport path is provided from a medium input to a waste collection point.

17. The apparatus of claim 1, wherein the medium is transported continuously along the medium transport path from the input to the print and build modules wherein the medium is first printed and subsequently profiled to define a media layer of the build object.

18. The apparatus of claim 1, wherein the print head is movable between the first print station and the second print station for printing first and second sides of the medium.

19. The apparatus of claim 1, wherein the transport means is configured to invert the medium as the medium is transported from the first print station to the second print station.

20. The apparatus of claim 1, comprising a single print head.

21. The apparatus of claim 1, the first print station configured for printing the medium in a first orientation, the second print station configured for printing the medium is a second orientation.

22. The apparatus of claim 1, the transport means comprising a receptacle for receiving the medium in continuous roll form.

23. The apparatus of claim 1 wherein the medium is transported to a location above the build plate for profiling to a cut a portion of the medium from the roll to define a media layer of the object.

* * * * *